(12) United States Patent
Luo et al.

(10) Patent No.: US 11,818,992 B1
(45) Date of Patent: Nov. 21, 2023

(54) PLANT LAMP

(71) Applicant: SINOWELL (SHANGHAI) CO., LTD., Shanghai (CN)

(72) Inventors: Jia Luo, Shanghai (CN); Yunfei Duan, Shanghai (CN); Liang Zhou, Shanghai (CN)

(73) Assignee: SINOWELL (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/820,556

(22) Filed: Aug. 17, 2022

(30) Foreign Application Priority Data

Jul. 21, 2022 (CN) .......................... 202210863932.3

(51) Int. Cl.
*A01G 7/04* (2006.01)
*F21V 19/00* (2006.01)
*F21Y 115/10* (2016.01)

(52) U.S. Cl.
CPC ............ *A01G 7/045* (2013.01); *F21V 19/003* (2013.01); *F21V 19/0025* (2013.01); *F21Y 2115/10* (2016.08)

(58) Field of Classification Search
CPC .... A01G 7/045; F21V 19/0025; F21V 19/003
See application file for complete search history.

(56) References Cited

U.S. PATENT DOCUMENTS

2021/0041095 A1* 2/2021 Dost ...................... F21V 21/30

FOREIGN PATENT DOCUMENTS

CN            104696895 A    *  6/2015

* cited by examiner

*Primary Examiner* — Karabi Guharay
(74) *Attorney, Agent, or Firm* — METIS IP LLC

(57) ABSTRACT

Some embodiments of the present disclosure provide a plant lamp. The plant lamp may include one or more light-emitting units and a lamp holder. Each of the one or more light-emitting units may include a light-emitting side and a non-light-emitting side oppositely disposed. The one or more light-emitting units may be mounted on the lamp holder. The plant lamp may further include one or more dynamic connection components. Each of the one or more dynamic connection components may be configured to connect at least one of the one or more light-emitting units to the lamp holder, and may enable the at least one light-emitting unit to rotate relative to the lamp holder to adjust a light-emitting direction of the at least one light-emitting unit.

19 Claims, 24 Drawing Sheets

PLANT LAMP

CROSS-REFERENCE TO RELATED APPLICATIONS

This application claims priority of Chinese Patent Application No. 202210863932.3, filed on Jul. 21, 2022, the entire contents of which are hereby incorporated by reference.

TECHNICAL FIELD

The present disclosure relates to the technical field of lamps, and in particular, to a plant lamp.

BACKGROUND

A plant lamp may be used to supplement light for a plant or completely replace sunlight by simulating the sunlight that is needed for photosynthesis in plant growth.

For different plants, light intensity required for growth may be different. For a same plant, the light intensity required at different growth stages may also vary. In order to meet light intensity requirements of growth of different plants and light intensity requirements of the same plant at different growth stages, a manner of changing a light-emitting intensity of a light source is mostly adopted in the prior art, that is, a light source with variable power is adopted to adjust the light-emitting intensity, which has high cost. In addition, because a heat dissipation structure is mostly wrapped in a lampshade, there is also a problem of a poor heat dissipation effect.

Therefore, it is desirable to provide a plant lamp that is easy to be adjusted and has a good heat dissipation effect.

SUMMARY

One of the embodiments of the present disclosure provides a plant lamp including one or more light-emitting units, each of which may include a light-emitting side and a non-light-emitting light oppositely disposed; a lamp holder, wherein the one or more light-emitting units may be mounted on the lamp holder; and one or more dynamic connection components, each of which may be configured to connect at least one of the one or more light-emitting units to the lamp holder, and may enable the at least one light-emitting unit to rotate relative to the lamp holder to adjust a light-emitting direction of the at least one light-emitting unit.

In some embodiments, each of the one or more dynamic connection components may have a plurality of preset positions so that the at least one light-emitting unit may be rotated to a plurality of preset angles corresponding to the plurality of preset positions and locked.

In some embodiments, at least two of the one or more dynamic connection components may have different preset positions.

In some embodiments, opposite ends of each of the one or more light-emitting units may be respectively mounted on the lamp holder through one of the dynamic connection components.

In some embodiments, each of the one or more dynamic connection components may include a connection unit. The connection unit may include a first connection part disposed on one of the at least one light-emitting unit and the lamp holder and a second connection part disposed on the other of the at least one light-emitting unit and the lamp holder. The second connection part may be inserted into or separated from the first connection part.

In some embodiments, the first connection part may include a connection plate provided with a plurality of locking holes. The plurality of locking holes may be disposed at an interval along a circumferential direction of a rotation axis of the at least one light-emitting unit relative to the lamp holder. The second connection part may be a protruding structure. The protruding structure may be inserted into any one of the locking holes. The connection plate may be elastically deformed so that the first connection part may be separated from the second connection part.

In some embodiments, the first connection part may be disposed on the at least one light-emitting unit. The dynamic connection component may further include a mounting seat connected to the lamp holder. One end of the rotation axis may be connected to the at least one light-emitting unit, and the other end may be connected to one end of the connection plate after passing through the mounting seat. The rotation axis may be rotatably connected to the mounting seat, and the locking holes may be disposed on the other end of the connection plate.

In some embodiments, the second connection part may further include a limit part. The limit part may abut against the connection plate when the protruding structure is inserted into any one of the locking holes.

In some embodiments, the protruding structure may be a step structure including a small diameter section that can be inserted into any one of the locking holes and a large diameter section that connects the small diameter section to the lamp holder. A step surface formed by the small diameter section and the large diameter section may be the limit part.

In some embodiments, each of the one or more dynamic connection component may include a connection unit. The connection unit may include a first connection hole disposed on one of the at least one light-emitting unit and the lamp holder; a second connection hole disposed on the other of the at least one light-emitting unit and the lamp holder, wherein the second connection hole may be an arc-shaped hole, and may be coaxial with a rotation axis of the at least one light-emitting unit relative to the lamp holder; and a locking member penetrated through the first connection hole and the second connection hole, wherein the locking member may move in the second connection hole along a circumferential direction of the rotation axis, and may lock the at least one light-emitting unit and the lamp holder.

In some embodiments, the plant lamp may further include a plurality of suspension parts. Each of two opposite ends of the lamp holder may be respectively provided with one of the plurality of suspension parts which is configured to hook and connects with a hook for the plant lamp.

In some embodiments, two ends of each of the plurality of suspension part may be respectively connected with mounting rings. An upper side of the lamp holder may be folded inward to form a flange, and the mounting rings and the flange may be connected by fasteners.

In some embodiments, at least two of the one or more light-emitting units may be linked.

In some embodiments, different light-emitting angles may be formed when the at least two light-emitting units are linked.

In some embodiments, the plant lamp may further include a control rod configured to control the at least two light-emitting units to be linked.

In some embodiments, the lamp holder may be rotatable in a horizontal plane.

In some embodiments, the plant lamp may further include an electric device configured to receive a light-emitting direction adjustment instruction, and adjust the light-emitting direction of the at least one light-emitting unit based on the light-emitting direction adjustment instruction.

In some embodiments, the light-emitting direction adjustment instruction may be determined based on a machine learning model.

In some embodiments, the light-emitting direction adjustment instruction may be determined based on a light-emitting intensity and a light-emitting duration of each of the one or more light-emitting units.

In some embodiments, the electric device may be further configured to form, based on the light-emitting direction adjustment instruction, a light-emitting adjustment scheme; adjust, based on the light-emitting adjustment scheme, the light-emitting direction of the at least one light-emitting unit. The light-emitting adjustment scheme may include direction adjustment of the one or more light-emitting units at a plurality of consecutive time points.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
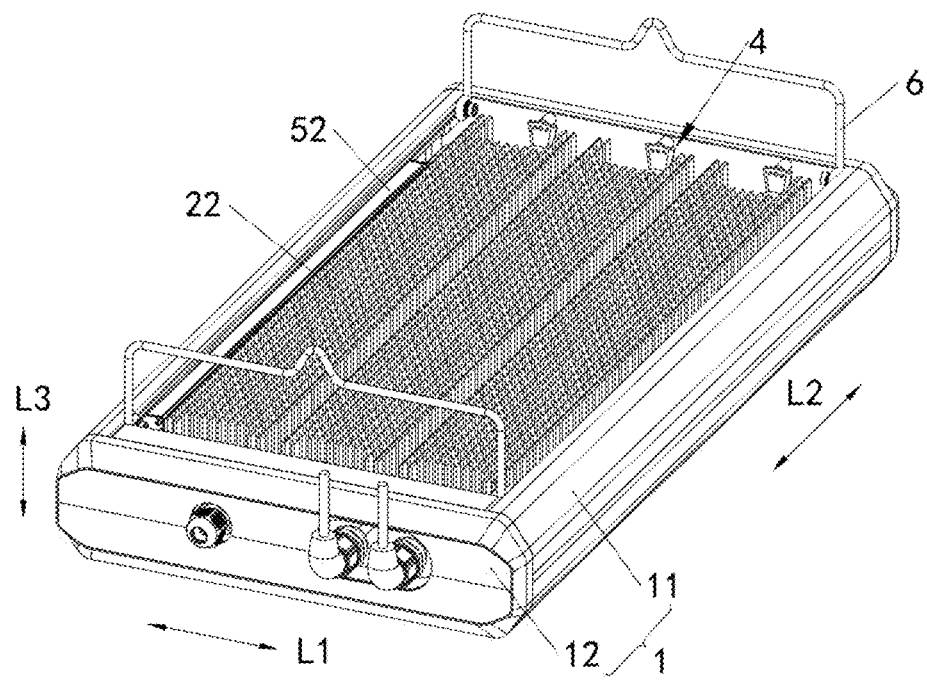
FIG. 1 is a schematic diagram illustrating a structure of a plant lamp (mounted with a heat dissipation unit) according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural forms unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

The present disclosure is further described in detail below in conjunction with the drawings and embodiments. It should be understood that the embodiments described herein are merely intended to illustrate the present disclosure, but not to limit the present disclosure. In addition, it should be noted that, for convenience of illustration, only a part of structures relevant to the present disclosure instead of all structures are shown in the drawings.

In the description of the present disclosure, unless otherwise expressly specified and limited, terms of "connected," "connection," and "fixed" should be construed in a broad sense, for example, a fixed connection, a detachable connection, or an integral; a mechanical connection or an electrical connection; a direct connection, an indirect connection through an intermediate medium, an internal connection between two elements, or an interaction relationship between two elements. For those skilled in the art, specific meanings of the above terms in the present disclosure can be understood according to specific situations.

In the present disclosure, unless otherwise expressly specified and limited, a first feature being "over" or "under" a second feature may include that the first feature and the second feature are in direct contact, or that the first feature and the second feature are not in direct contact but are in contact through another feature between them. Moreover, the first feature being "above," "on the top of" and "over" the second feature includes the first feature being directly above and obliquely above the second feature, or simply means that the first feature has a higher level than the second feature. The first feature is "below," "on the bottom of" and "under" the second feature includes the first feature being directly below and obliquely below the second feature, or simply means that the first feature has a lower level than the second feature.

In the description of the embodiments, the orientation or positional relationship of terms "upper," "lower," "right," etc. is the orientation or positional relationship shown in the drawings, and is merely for convenience of description and simplicity of operation, rather than indicating or implying that the referred device or element must have a specific orientation, be constructed and operated in a specific orientation, which should not be construed as a limitation of the present disclosure. In addition, terms of "first" and "second" are merely used for distinction in description and have no special meaning.

A plant lamp may be configured to supplement light for a plant or completely replace sunlight under a condition of insufficient natural light by simulating a principle that plant growth needs sunlight for photosynthesis. The plant lamp may be used in scenarios such as gardening, plant reproduction, etc.

Figure 2:
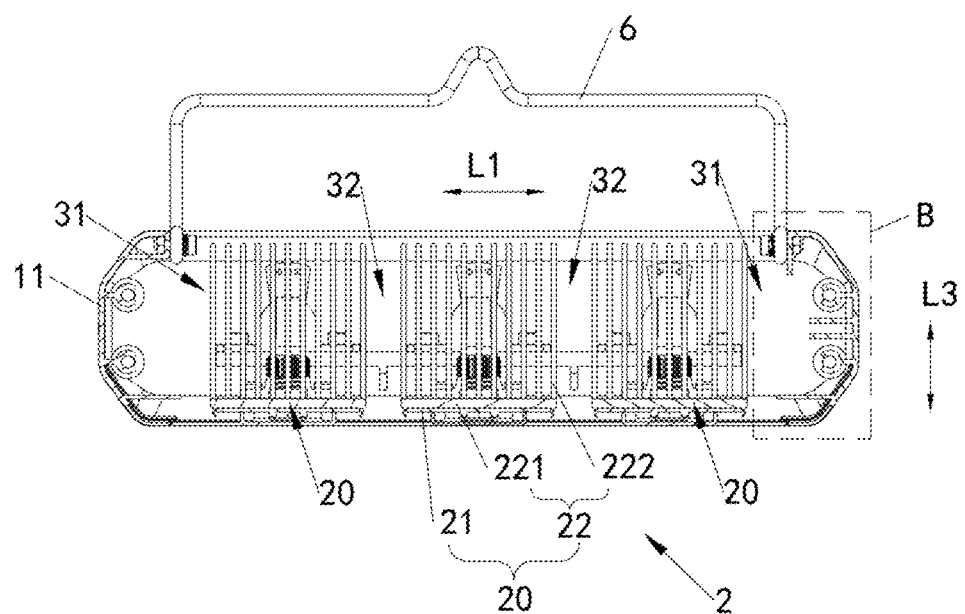
FIG. 2 is a sectional view 1 illustrating a plant lamp (mounted with a heat dissipation unit) according to some embodiments of the present disclosure.
Figure 15:
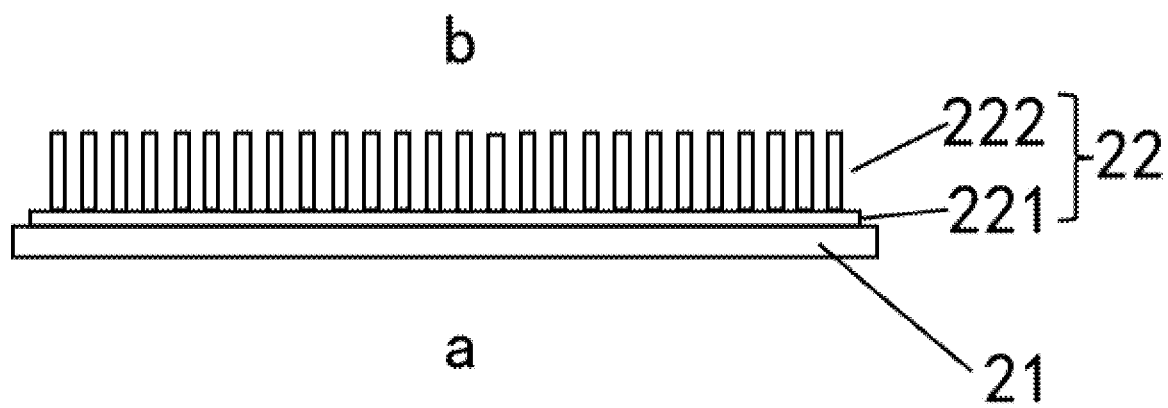
FIG. 15 is a schematic diagram illustrating a structure of a light-emitting unit and a heat dissipation unit according to some embodiments of the present disclosure.

FIG. 1 is a schematic diagram illustrating a structure of a plant lamp (mounted with a heat dissipation unit) according to some embodiments of the present disclosure. FIG. 2 is a sectional view 1 illustrating a plant lamp (mounted with a heat dissipation unit) according to some embodiments of the present disclosure. FIG. 15 is a schematic diagram illustrating a structure of a light-emitting unit and a heat dissipation unit according to some embodiments of the present disclosure.

As shown in FIGS. 1 and 2, in some embodiments, the plant lamp may include one or more light-emitting units 21 and a lamp holder 1.

The light-emitting unit 21 may be a component for light-emitting, such as an incandescent lamp, a light-emitting diode (LED), or the like. A structure of the light-emitting unit 21 may be a structure such as a strip-shaped structure, a tubular structure, a plate-shaped structure, etc., which is not be limited. For example, the structure of the light-emitting unit 21 may be a lamp tube, a lamp strip, a light bulb, etc. In some embodiments, the light-emitting unit 21 may be a plate-shaped structure. In some embodiments, the light-emitting unit 21 may include a light-emitting side and a non-light-emitting side oppositely disposed.

The light-emitting side may refer to a side of the light-emitting unit 21 used to emit light to outside. The non-light-emitting side may refer to a side of the light-emitting unit 21 not used to emit light to outside. For example, a side of a LED panel lamp close to a mounting wall may be regarded as the non-light-emitting side, and a side of the LED panel lamp with lamp beads may be regarded as the light-emitting side.

The light-emitting side and the non-light-emitting side being oppositely disposed may be understood as the light-emitting side and the non-light-emitting side are respectively located on two opposite sides of the light-emitting unit. As shown in FIG. 15, a downward side (side a) of the light-emitting unit 21 shown in FIG. 15 is the light-emitting side, and an upward side (side b) is the non-light emitting side.

The lamp holder 1 may be a member used to mount a lamp assembly. In some embodiments, the lamp holder 1 may be designed with various structures as required, such as a rod shape, a box shape, etc., which is not limited herein.

In some embodiments, the light-emitting unit 21 may be mounted on the lamp holder 1. The light-emitting unit 21 and the lamp holder 1 may be mounted in various ways, which may be a fixed connection or a movable connection, a direct connection or an indirect connection. In some embodiments, the light-emitting unit 21 may be connected to the lamp holder 1 through a connection component, and relative positions of the light-emitting unit 21 and the lamp holder 1 may be adjusted through the connection component.

Figure 11:
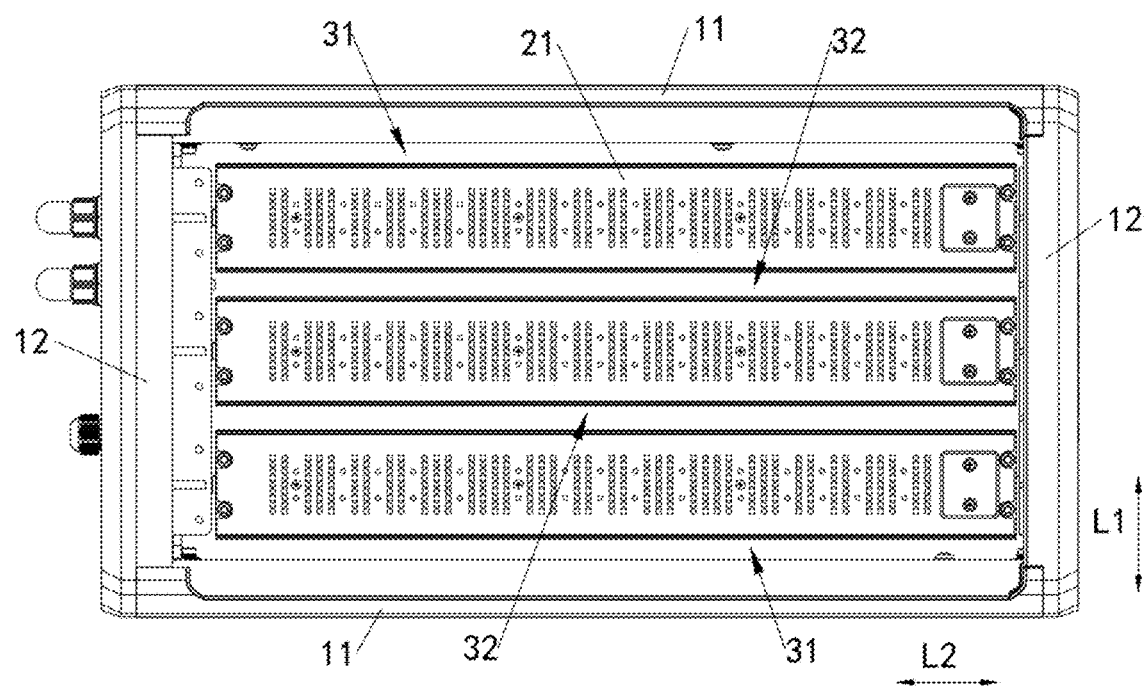
FIG. 11 is a bottom view illustrating the plant lamp in FIG. 1 according to some embodiments of the present disclosure.
Figure 12:
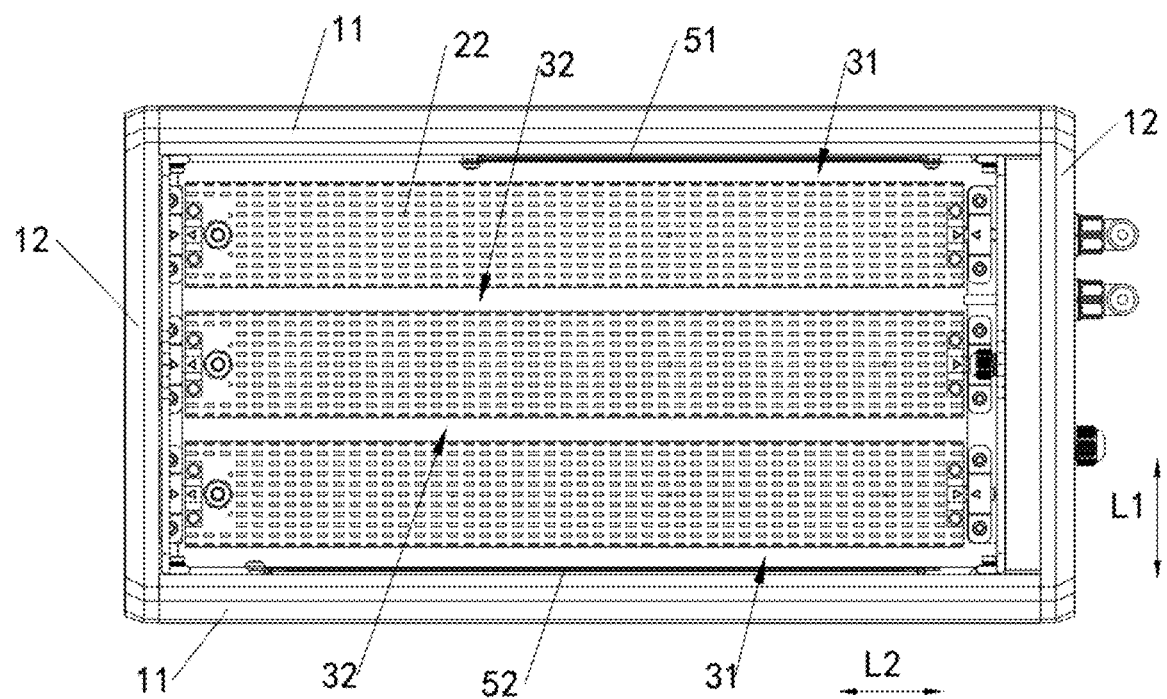
FIG. 12 is a top view illustrating the plant lamp in FIG. 1 according to some embodiments of the present disclosure.

FIG. 11 is a bottom view illustrating the plant lamp in FIG. 1 according to some embodiments of the present disclosure. FIG. 12 is a top view illustrating the plant lamp in FIG. 1 according to some embodiments of the present disclosure.

As shown in FIG. 2, FIG. 11, FIG. 12 and FIG. 15, in some embodiments, the plant lamp may include a heat dissipation unit 22. The heat dissipation unit 22 located on the non-light-emitting side of at least one light-emitting unit 21 and connected to the at least one light-emitting unit 21 may be configured for heat dissipation of the at least one light-emitting unit 21.

The heat dissipation unit 22 may be a component for heat dissipation. A structure of the heat dissipation unit 22 is not limited, which may be a heat dissipation fin, a heat dissipation fan, etc. In some embodiments, the plant lamp may include a heat dissipation unit 22 of one or more structures. In some embodiments, the heat dissipation unit 22 may include a heat dissipation plate 221, and a heat dissipation fin 222 on one side of the heat dissipation plate 221. The other side of the heat dissipation plate 221 may be disposed in close contact with a non-light-emitting side of a corresponding light-emitting unit 21. The heat dissipation plate 221 may be connected to the corresponding light-emitting unit 21, so that the heat dissipation plate 221 and the light light-emitting unit 21 may be in large-area contact, thereby improving heat dissipation effect of the light-emitting unit 21. In a specific embodiment, the heat dissipation plate 221 may be connected to the corresponding light-emitting unit 21 through a plurality of fasteners.

A count of heat dissipation units 22 is not limited, which may be one or a plurality of. In some embodiments, a single heat dissipation unit 22 may be connected to a plurality of light-emitting units 21 at the same time, and a plurality of heat dissipation units 22 may also be connected to a same light-emitting unit 21.

As shown in FIG. 1 and FIG. 2, in some embodiments, the plant lamp may include the lamp holder 1, a light-emitting component 2, and a dynamic connection component 4. The light-emitting component 2 may include a plurality of light-emitting units 21. In some embodiments, the light-emitting unit 21 may be mounted on the lamp holder 1 through at least one dynamic connection component 4. The dynamic connection component may be configured to connect at least one of the light-emitting units 21 to the lamp holder 1, and enable the light-emitting unit 21 to rotate relative to the lamp holder 1 to adjust a light-emitting direction of the light-emitting unit 21. In some embodiments, the dynamic connection component 4 may be configured to selectively lock a corresponding light-emitting unit 21 with the lamp holder 1 so as to fix the light-emitting unit 21 relative to the lamp holder 1, or unlock the light-emitting unit 21 so that the light-emitting unit 21 may rotate relative to the lamp holder 1 to adjust the light-emitting direction of the light-emitting unit 21.

The dynamic connection component 4 may be a member that mounts the lamp assembly on the lamp holder, and may rotate itself to realize change of a light-emitting direction of a lamp. A structure of the dynamic connection component 4 is not limited, which may be a link transmission, a gear transmission, or an electric transmission. In some embodiments, the dynamic connection component 4 may be composed of three parts, that is, a transmission part and two connection parts. A transmission part may realize a connection between the light-emitting unit 21 and the lamp holder 1 through two connection parts, that is, one connection part provided on one of the light-emitting unit 21 and the lamp holder 1 and the other connection part provided on the other one of the light-emitting unit 21 and the lamp holder 1. Specifically, the dynamic connection component 4 may include a transmission gear, and two mechanical arms arranged on the transmission gear. One end of one mechanical arm may be fixed on the lamp holder 1, and the other mechanical arm is connected to the light-emitting unit 21. The light-emitting direction of the light-emitting unit 21 fixed on the mechanical arm may be changed through the transmission gear.

In some embodiments, the plant lamp may include a plurality of light-emitting units 21. Each light-emitting unit 21 may rotate relative to the lamp holder 1 so that the light-emitting direction of the light-emitting unit 21 can be adjusted. The dynamic connection component 4 may lock the light-emitting unit 21 with the lamp holder 1. The light-emitting intensity of the light-emitting component 2 may be adjusted by adjusting the light-emitting direction of each light-emitting unit 21, so as to meet requirements of light intensity of different plants, and different growth stages of a same plant. The light-emitting direction of the plant lamp may be adjusted according to an actual mounting position of the plant lamp to meet mounting requirements.

In some embodiments, the plurality of light-emitting units 21 may be disposed at an interval along a first direction. The light-emitting units 21 may extend along a second direction. The second direction and the first direction may be intersected. Two ends of each light-emitting unit 21 in the second direction are respectively mounted on the lamp holder 1 through a connection component 4. The rotation axis 43 of the light-emitting unit 21 relative to the lamp holder 1 may extend along the second direction. The plurality of light-emitting units 21 may be disposed at an interval along the first direction, so that when a light-emitting direction of a light-emitting unit 21 is adjusted, there may be no interference between the light-emitting unit 21 and an adjacent light-emitting unit 21 thereof.

For example, there may be three light-emitting units 21. The second direction may be perpendicular to the first direction. When the plant lamp is hung and mounted, the first direction and the second direction may be both perpendicular to a vertical direction. The first direction, the second direction and the vertical direction may be respectively a L1 direction, a L2 direction and L3 direction shown in the figures. The lamp holder 1 may be a rectangular frame. It should be noted that an included angle between the second direction and the first direction is not limited to 90°, and the lamp holder 1 is not limited to being the rectangular frame. A count of light-emitting units 21 is not limited to three, but may also be two, four, five or more.

In some embodiments, as shown in FIG. 1 and FIG. 2, opposite ends of each light-emitting unit 21 may be respectively mounted on the lamp holder 1 through a dynamic connection component 4. In some embodiments, two ends of the light-emitting unit 21 in the second direction L2 are respectively mounted on the lamp holder 1 through the dynamic connection component 4. In this way, after the light-emitting direction of the light-emitting unit 21 is adjusted, the light-emitting unit 21 may be kept stable relative to the lamp holder 1 through two dynamic connection components 4, so as to improve stability of the light-emitting unit 21.

In some embodiments, the light-emitting unit 21 may have four working states, namely, a normal working state, a light-gathering state, a polarized state, and a light-expanding state. The following takes three light-emitting units 21 as an example.

Figure 3:
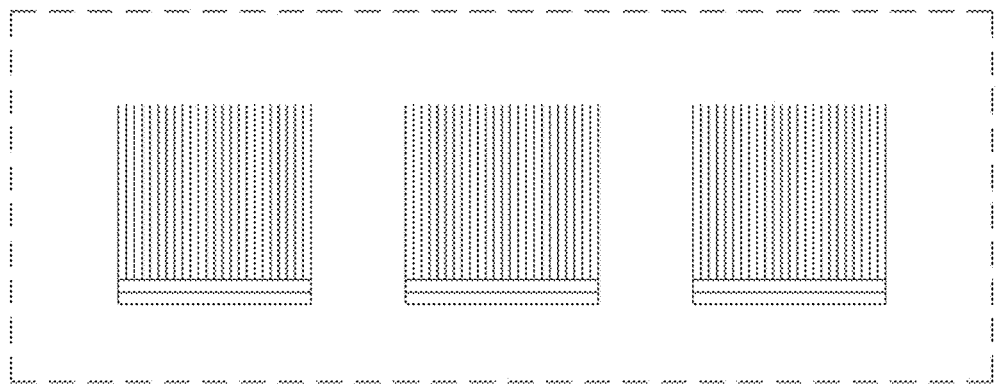
FIG. 3 is a schematic diagram illustrating a light-emitting component in a normal working state according to some embodiments of the present disclosure.

FIG. 3 is a schematic diagram illustrating a light-emitting component in a normal working state according to some embodiments of the present disclosure. As shown in FIG. 3, the light-emitting direction of each light-emitting unit 21 may be the vertical direction.

Figure 4:
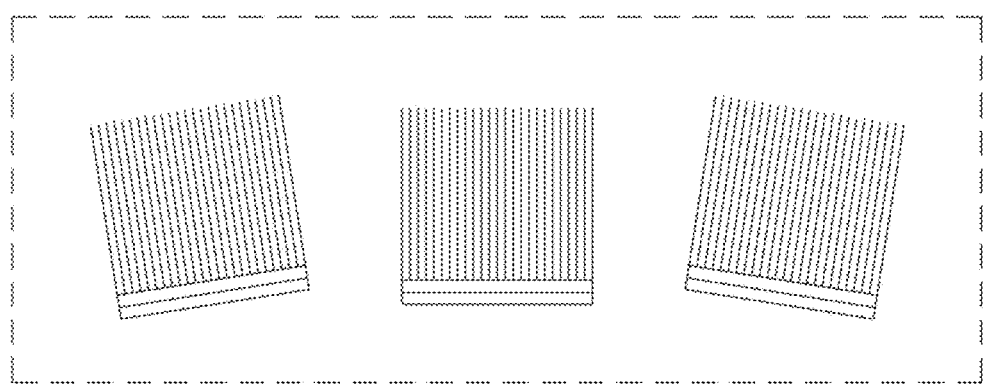
FIG. 4 is a schematic diagram illustrating the light-emitting component in a light-gathering state according to some embodiments of the present disclosure.

FIG. 4 is a schematic diagram illustrating the light-emitting component in a light-gathering state according to some embodiments of the present disclosure. As shown in FIG. 4, the light-emitting direction of the light-emitting unit 21 in the middle is the vertical direction when working. Light emitted by the two light-emitting units 21 located on both sides when working is gathered towards light emitted by the light-emitting unit 21 in the middle.

Figure 5:
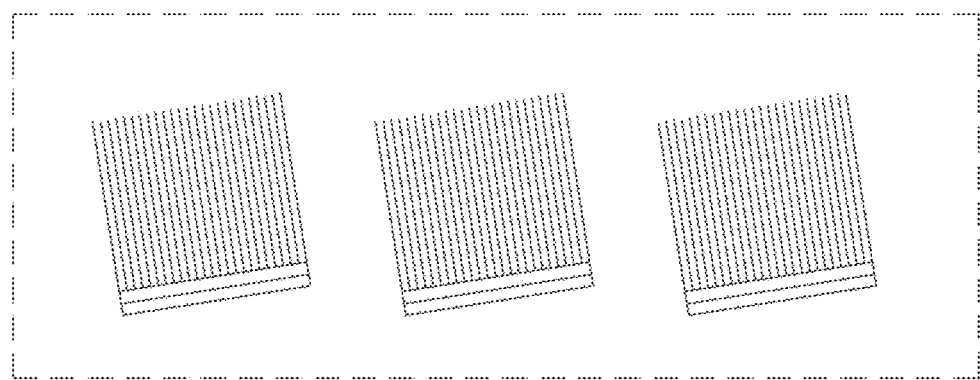
FIG. 5 is a schematic diagram illustrating the light-emitting component in a polarized state according to some embodiments of the present disclosure.

FIG. 5 is a schematic diagram illustrating the light-emitting component in a polarized state according to some embodiments of the present disclosure. As shown in FIG. 5, the light-emitting direction of each light-emitting unit 21 may intersect with the vertical direction when working, and light emitted by the three emitting units 2 may be inclined to a same side.

Figure 6:
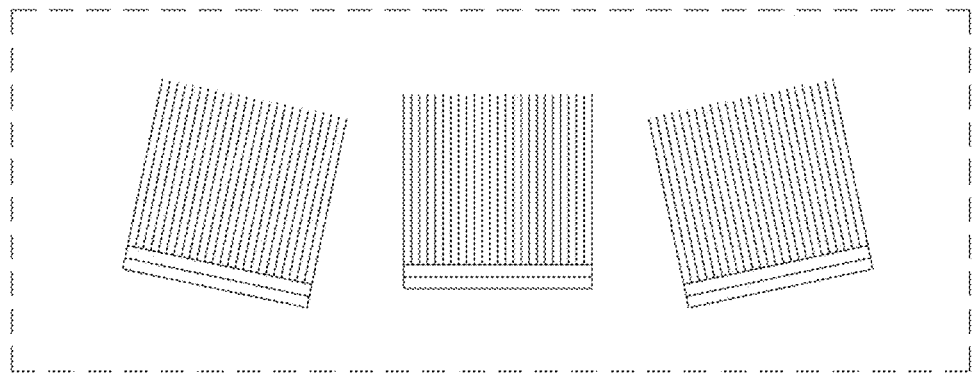
FIG. 6 is a schematic diagram illustrating the light-emitting component in a light-expanding state according to some embodiments of the present disclosure.

FIG. 6 is a schematic diagram illustrating the light-emitting component in a light-expanding state according to some embodiments of the present disclosure. As shown in FIG. 6, the light-emitting direction of the light-emitting unit 21 in the middle is the vertical direction when working. Light emitted by two light-emitting units located on both sides when working is expanded toward relative to light emitted by the light-emitting unit 21 in the middle.

In some embodiments, the dynamic connection component 4 may have a plurality of preset positions, so that the light-emitting unit 21 may be rotated to a plurality of preset angles corresponding to the plurality of preset positions and locked. The preset position may be a preset position state of the dynamic connection component 4. The dynamic connection component 4 may make the light-emitting unit 21 form a certain angle accordingly at a corresponding preset position. The angle may be considered as a preset angle corresponding to the preset position. Each preset position may correspond to a preset angle. The dynamic connection component 4 may lock the light-emitting unit 21 at the preset angle by locking it at the preset position. The light-emitting unit 21 may choose different preset positions based on light requirements. In some embodiments, the dynamic connection component 4 may rotate the light-emitting unit 21 by using its own rotating component and may lock the light-emitting unit 21 when the light-emitting unit 21 rotates to a preset angle through any component that can be locked and fitted, such as a screw bolt, a screw hole, a protrusion, a groove, etc.

In some embodiments, the plurality of dynamic connection components 4 may have a same preset position or different preset positions. In some embodiments, at least two dynamic connection components 4 may have the different preset positions. In some embodiments, based on the different preset positions, the plurality of light-emitting units 21 may have different preset angles. Merely by way of example, for three light-emitting units 21 respectively connected to the dynamic connection components 4, each dynamic connection component 4 may have a plurality of preset positions. The plurality of preset positions of the three dynamic connection components 4 may be different, so that the three light-emitting units 21 may respectively form different angles and be locked at the angles. One light-emitting unit 21 may respectively form an included angle of 30°, 45°, and 60° with respect to a horizontal plane, and may be locked at any of the included angles. Another light-emitting unit 21 may respectively form 10°, 20°, and 30° with respect to the horizontal plane, and may be locked at any of the included angles. A remaining one light-emitting unit 21 may respectively form an included angle of 5°, 8°, 15°, 20°, and 30° with respect to the horizontal plane, and may be locked at any of the included angles.

Figure 7:
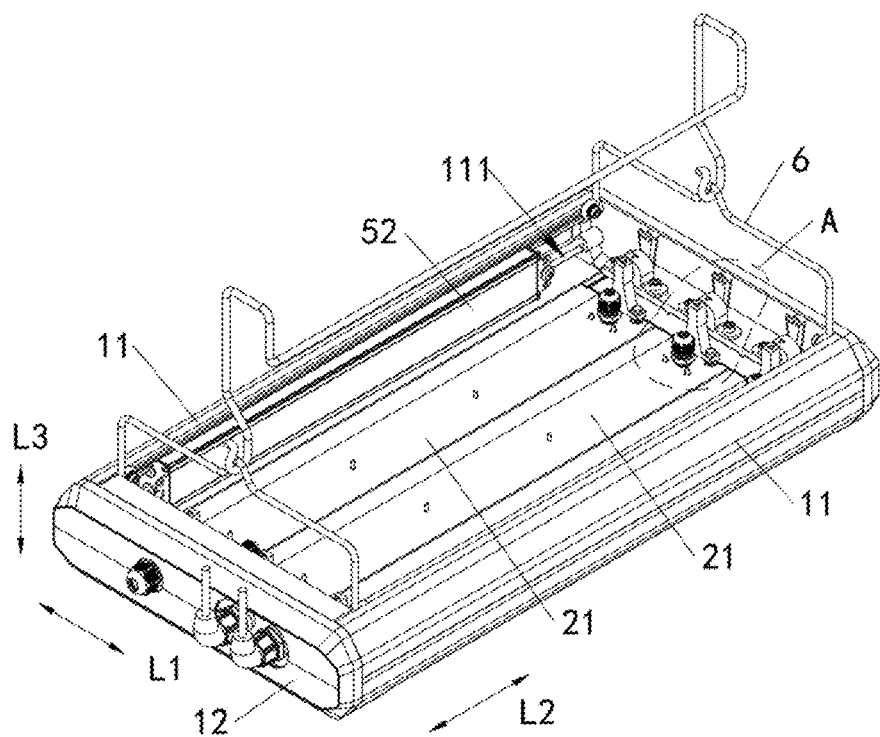
FIG. 7 is a schematic diagram illustrating a structure of a plant lamp (without a heat dissipation unit) according to some embodiments of the present disclosure.
Figure 8:
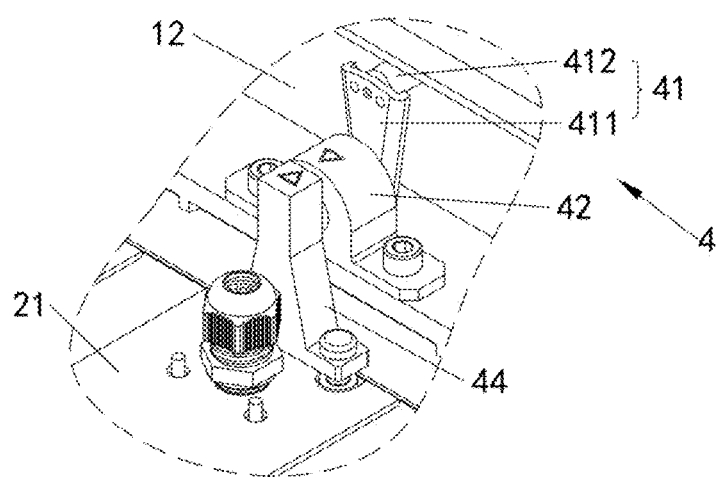
FIG. 8 is a partial enlargement schematic view illustrating a part A in FIG. 7 according to some embodiments of the present disclosure.
Figure 9:
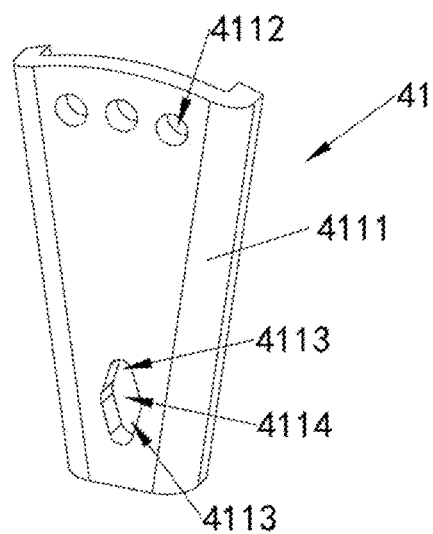
FIG. 9 is a schematic diagram illustrating a first connection part according to some embodiments of the present disclosure.
Figure 10:
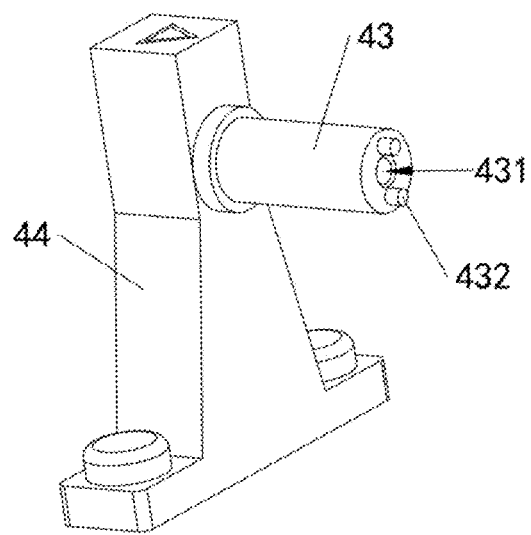
FIG. 10 is a schematic diagram illustrating a structure of a connecting shaft according to some embodiments of the present disclosure.

FIG. 7 is a schematic diagram illustrating a structure of a plant lamp (without a heat dissipation unit) according to some embodiments of the present disclosure. FIG. 8 is a partial enlargement schematic view illustrating a part A in FIG. 7 according to some embodiments of the present disclosure. FIG. 9 is a schematic diagram illustrating a first connection part according to some embodiments of the present disclosure. FIG. 10 is a schematic diagram illustrating a structure of a connecting shaft according to some embodiments of the present disclosure.

In some embodiments, as shown in FIG. 7, FIG. 8, FIG. 9 and FIG. 10, the dynamic connection component 4 may include a connection unit 41. In some embodiments, the connection unit 41 may include a first connection part 411 and a second connection part 412. The first connection part 411 may be disposed on one of a light-emitting unit 21 and a lamp holder 1. The second connection part 412 may be disposed on the other of the light-emitting unit 21 and the lamp holder 1. The second connection part 412 may be inserted into or separated from the first connection part 411. In some embodiments, the first connection part 411 may be disposed on the light-emitting unit 21, and the second connection part 412 may be disposed on the lamp holder 1. In some embodiments, structures of the first connection part 411 and the second connection part 412 is not limited, which may be a strip-like structure, a sheet-like structure, or a block-like structure. In some embodiments, the second connection part 412 may be provided with a protruding structure or other components, so as to be inserted into or separated from a component on the first connection part 411.

In some embodiments, the first connection part 411 may include a connection plate 4111 provided with a plurality of locking holes 4112. The plurality of locking holes 4112 may be disposed at an interval along a circumferential direction of a rotation axis of the light-emitting unit 21 relative to the lamp holder 1. The connection plate 4111 may be configured to provide with different components so that the first connection part 411 may be inserted into or separated from the second connection part 412, or connected with the light-emitting unit 21 to realize a position change of the light-emitting unit 21. In some embodiments, a screw bolt structure may also be disposed on the connection plate 4111 to realize the connection and rotation of the light-emitting unit 21.

In some embodiments, the first connection part 411 may include a connection plate 4111 provided with a plurality of locking holes 4112. The plurality of locking holes 4112 may be disposed at an interval along a circumferential direction of a rotation axis 43 of the light-emitting unit 21 relative to the lamp holder 1. The second connection part 412 may be a protruding structure. The protruding structure may be inserted into any locking hole 4112. The connection plate 4111 may be elastically deformed so that the first connection part 411 may be separated from the second connection part 412.

In some embodiments, there may be three locking holes 4112 on each connection plate 4111. It should be noted that a count of locking holes 4112 is not limited to three, but may also be four, five or more, which can achieve more refined adjustment of the light-emitting direction.

In some embodiments, the first connection part 411 may be inserted into or separate from the second connection part 412 by manually adjusting the light-emitting direction of the light-emitting unit 21. In some embodiments, each light-emitting unit 21 may also be provided with an electric drive structure such as a motor, an output shaft of the motor may be connected with the rotation axis 43 in a transmission manner, and the rotation axis 43 may be driven by the motor to drive the light-emitting unit 21 to rotate, so as to realize automatic adjustment of the light-emitting direction of the light-emitting unit 21.

In some embodiments, the first connection part 411 may be disposed on the light-emitting unit 21. The dynamic connection component 4 may also include a mounting seat 42. The mounting seat 42 may be connected to the lamp holder 1. One end of the rotation axis 43 may be connected to the light-emitting unit 21. The other end may be connected to one end of the connection plate 4111 after passing through the mounting seat 42. The rotation axis 43 may be rotatably connected to the mounting seat 42, and the locking hole 4112 may be disposed on the other end of the connection plate 4111. The mounting seat 42 may be a member with a hole fixed on the lamp holder 1, and may locate an orientation of the rotation axis 43. In some embodiments, the mounting seat 42 can improve stability of the light-emitting unit 21 when the light-emitting unit 21 and the lamp holder 1 are locked by the connection unit 41 and facilitate adjustment of the light-emitting direction of the light-emitting unit 21.

In some embodiments, in order to connect the light-emitting unit 21 and the connection plate 4111 through the rotation axis 43, one end of the rotation axis 43 may be connected with a connection seat 44, and the connection seat 44 may be connected to the light emitting unit 21 by a fastener. The other end of the rotation axis 43 may be provided with a threaded hole 431, and the connection plate 4111 may be provided with a penetrating hole 4114. The rotation axis 43 may be connected to the connection plate 4111 by a screw bolt passing through the penetrating hole 4114 and threadedly connected to the threaded hole 431. In order to prevent the rotation axis 43 from rotating relative to the connection plate 4111, one of the connection plate 4111 and the rotation axis 43 may be provided with a positioning hole 4113, the other may be provided with a positioning protrusion 432, and the positioning hole 4113 and the positioning protrusion 432 may be inserted. For example, the positioning hole 4113 may be disposed on the connection plate 4111, and the positioning protrusion 432 may be disposed on an axial end surface of the rotation axis 43. There may be two positioning protrusions 432. The two positioning protrusions 432 and the threaded hole 431 may be arranged in a same direction, and the threaded hole 431 may be located between the two positioning protrusions 432. In order to simplify processing of the positioning hole 4113 and the penetrating hole 4114, radial side walls of the positioning hole 4113 and the penetrating hole 4114 may be drilled to form an oval hole.

In some embodiments, the second connection part 412 may be a protruding structure. The protruding structure may be inserted into any locking hole 4112. The connection plate 4111 may be elastically deformed, so that the first connection part 411 may be separated from the second connection part 412.

The protruding structure may be a protruding part of the second connection part 412, or may be a connection functional member disposed on the second connection part 412. For example, the protruding structure may be a tenon-and-mortise structure or a screw bolt structure. The first connecting portion 411 and the second connection part 412 may be connected and separated through a structure corresponding to the protruding structure disposed on the connection plate of the first connection portion 411 and a certain deformation.

In some embodiments, when the light-emitting direction of any light-emitting unit 21 needs to be adjusted, it may be only necessary to apply an external force to the connection plate 4111 in an opposite direction when the protruding structure is inserted into the locking hole 4112, and the connection plate 4111 may be elastically deformed, so that the protruding structure may gradually withdraw from the locking hole 4112. After the protruding structure withdraws from the locking hole 4112, the light-emitting unit 21 may be rotated, and the external force applied to the connection plate 4111 may be removed to restore the connection plate 4111 to a natural state after the protruding structure is aligned with an appropriate locking hole 4112. During the process, the protruding structure may be gradually inserted into the locking hole 4112, and the structure is simple and the operation is convenient.

In some embodiments, after the protruding structure is disengaged from the locking hole 4112, the light-emitting unit 21 may be supported by the mounting seat 42 at two ends of the light-emitting unit 21 to prevent the light-emitting unit 21 from being separated from the lamp holder 1, and at the same time, it may be convenient to rotate the light-emitting unit 21 to align the protruding structure with the appropriate locking hole 4112. After the protruding structure is inserted into the locking hole 4112, when the light-emitting unit 21 and the lamp holder 1 may be locked by the insertion of the protruding structure and locking hole 4112, the light-emitting unit 21 may be supported by the mounting seat 42, which may reduce a requirement on connection strength when the protruding structure and the locking hole 4112 are inserted.

In some embodiments, the second connection part 412 may also include a limit part. The limit part may abut against the connection plate 4111 when the protruding structure is inserted into any locking hole 4112. In some embodiments, the protruding structure may be configured to insert any locking hole 4112 and connect to the lamp holder 1.

In some embodiments, the insertion of the protruding structure and the locking hole 4112 may be limited by the limit part, which may prevent an insertion depth from being too large, and make it difficult for the protruding structure to disengage from the locking hole 4112. The structure is simple and easy to process. In order to facilitate the insertion of the protruding structure and the locking hole 4112, an outer surface of the protruding structure may be a cambered surface. When the protruding structure is inserted into the locking hole 4112, the outer surface of the protruding structure may have a function of guiding the connection plate 4111, so that the protruding structure may be inserted into the locking hole 4112 more easily.

In some embodiments, the protruding structure may be a step structure. In a specific embodiment, the protruding structure may include a small diameter section that can be inserted into any locking hole 4112 and a large diameter section that connects the small diameter section to the lamp holder 1. A step surface formed by the small diameter section and the large diameter section may be the limit part. It should be noted that the limit part is not limited to the step surface of the above-mentioned step structure. The limit part may also be directly mounted on the lamp holder 1.

In some embodiments, the dynamic connection component 4 may include the connection unit 41. The connection unit 41 may include a first connection hole, a second connection hole, and a locking member. In some embodiments, the first connection hole may be disposed on one of the light-emitting unit and the lamp holder. The second connection hole may be disposed on the other of the light-emitting unit 21 and the lamp holder 1. The second connection hole may be an arc-shaped hole, and may be coaxial with a rotation axis of the light-emitting unit 21 relative to the lamp holder 1. The locking member may be penetrated through the first connection hole and the second connection hole. The locking member may move in the second connection hole along a circumferential direction of the rotation axis, and may lock the light-emitting unit 21 and the lamp holder 1. Merely by way of example, the first connection hole may be disposed on the lamp holder 1. The second connection hole may be disposed on the connection plate 4111. The locking member may be a screw bolt and a screw nut. The screw bolt may pass through the first connection hole and the second connection hole and connect to the screw nut. After the light-emitting unit 21 is rotated to a suitable position, the screw nut may be tightened, and a head of the screw bolt may abut against the connection plate 4111, that is, the light-emitting unit 21 may be locked with the lamp holder 1.

It should be noted that the being coaxial is not being 100% coaxial. However, considering a reason of processing error, it is only required that when the light-emitting unit 21 is rotated, the connection plate 4111 may be rotated under transmission of the rotation axis 43 and may be inserted into any second connection hole.

The first connection hole may be a hole disposed on the light-emitting unit 21 and the lamp holder 1. The light-emitting unit 21 and the lamp holder 1 may be locked when the light-emitting unit 21 is rotated to a suitable position through the locking member and the second connection hole. A specific structure of the first connection hole is not limited, which may be an arc-shaped hole or a rectangular hole. For example, the first connection hole may be disposed on the lamp holder 1. The second connection hole may be disposed on the connection plate 4111. The locking member may connect the first connection hole with the second connection hole. After the light emitting unit 21 is rotated to a suitable position, the locking member may be locked, and the light-emitting unit 21 may be locked with the lamp holder 1.

The second connection hole may be disposed on the other of the light-emitting unit 21 and the lamp holder 1. The second connection hole may be coaxial with the rotation axis 43 of the light-emitting unit 21 relative to the lamp holder 1. The second connection hole may be an arc-shaped hole.

The locking member may be a member that penetrates the first connection hole and the second connection hole, move in the second connection hole along the circumferential direction of the rotation axis 43, and lock the light-emitting unit 21 and the lamp holder 1. A specific structure of the locking member is not limited, which may be a screw bolt and a screw nut, or a rivet. For example, the locking member may be a screw bolt and a screw nut. The screw bolt may pass through the first connection hole and the second connection hole and connect to the screw nut. After the light-emitting unit 21 is rotated to a suitable position, the screw nut may be tightened, and a head of the screw bolt may abut against the connection plate 4111, that is, the light-emitting unit 21 may be locked with the lamp holder 1.

Figure 13:
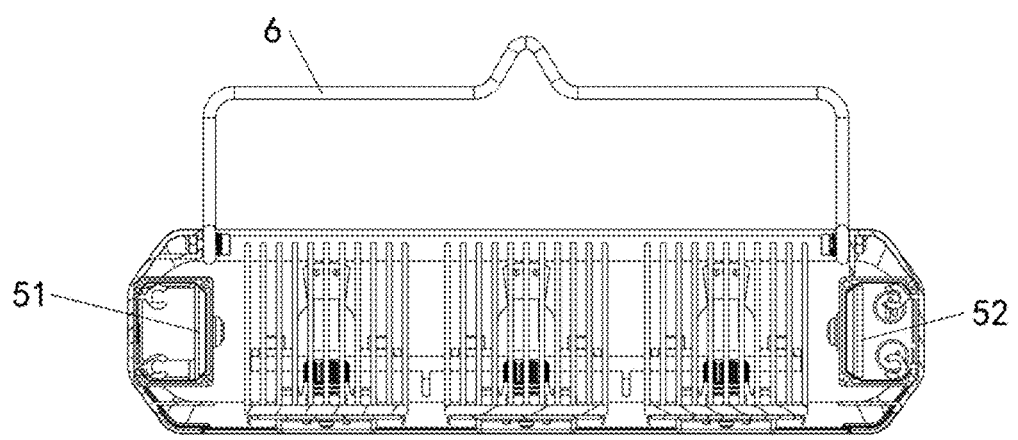
FIG. 13 is a sectional view 2 illustrating a plant lamp (mounted with a heat dissipation unit) according to some embodiments of the present disclosure.
Figure 14:
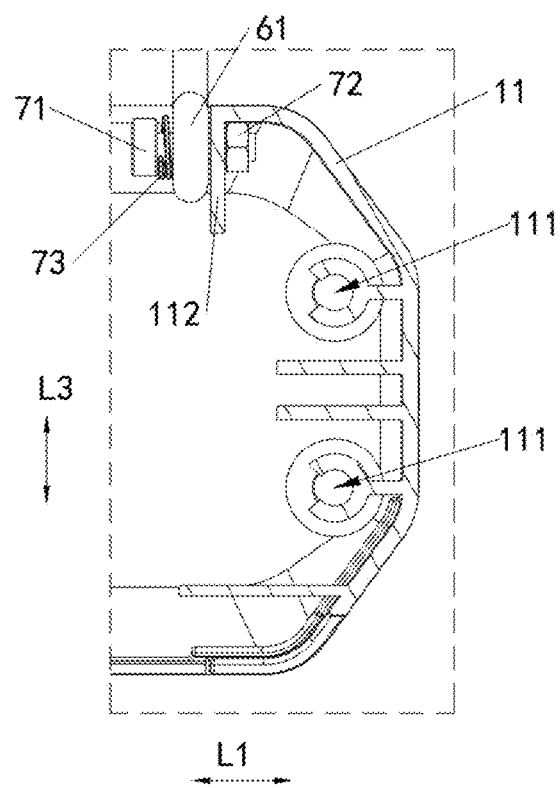
FIG. 14 is a partial enlargement schematic view illustrating a part B in FIG. 2 according to some embodiments of the present disclosure.

FIG. 13 is a sectional view 2 illustrating a plant lamp (mounted with a heat dissipation unit) according to some embodiments of the present disclosure. FIG. 14 is a partial enlargement schematic view illustrating a part B in FIG. 2 according to some embodiments of the present disclosure. In some embodiments, the plant lamp may also include suspension parts 6. Two opposite ends of the lamp holder 1 may be respectively provided with suspension parts 6, each of which is configured to hook and connects with a hook for the plant lamp.

In some embodiments, as shown in FIGS. 13 and 14, two suspension parts 6 may respectively be connected to the two opposite ends of the lamp holder 1, and plant lamp may be suspended and mounted by connecting the suspension parts 6 with the hooks for the plant lamp. For example, the two suspension parts 6 may be disposed on the two opposite ends of lamp holder 1 in the second direction.

In some embodiments, each of the two ends of the suspension part 6 may be respectively connected with a mounting ring 61. An upper side of the lamp holder 1 may be folded inward to form a flange 112. The mounting ring 61 and the flange 112 may be connected by a fastener.

In some embodiments, the upper side of a first frame 11 may be provided with the flange 112 folded inwardly. The mounting ring 61 and the flange 112 may be connected by a fastener. Specifically, the fastener may be a connection screw bolt 71 and a locking screw nut 72. A free end of the connection screw bolt 71 may pass through the mounting ring 61 and the flange 112 in sequence and then may be connected to the locking screw nut 72 for locking, and a head of the connection screw bolt 71 may prevent the mounting ring 61 from disengaging from the head of the connection screw bolt 71, so that mounting between the suspension part 6 and the first frame 11 may be realized.

In some embodiments, in order to facilitate mounting the suspension part 6 on the hook for the plant lamp, the suspension part 6 may rotate relative to the lamp holder 1. In a specific embodiment, an elastic element 73 may be sandwiched between the head of the connection screw bolt 71 and the mounting ring 61, such as an elastic washer or a spring that is sleeved outside the connection screw bolt 71. An inner diameter of the mounting ring 61 may be larger than a diameter of the connection screw bolt 71, so that the suspension part 6 may rotate at a small angle relative to the connection screw bolt 71 when the plant lamp is mounted. At the same time, in order to improve stability of the plant lamp in a suspension mounting, the elastic element 73 may be applied to exert an external force on the mounting ring 61 to press the mounting ring 61 to the flange 112.

In some embodiments, at least two light-emitting units 21 may change together. Changing together (or linkage) refers to a plurality of light-emitting units 21 making a preset position change at the same time. The position change may be set in advance. The position change may be the same or different. For example, the plurality of light-emitting units 21 may be changed to a same light-emitting direction together. As another example, the plurality of light-emitting units 21 may be deflected in different directions at the same time. Merely by way of example, for a plant that likes light, the plurality of light-emitting units 21 may be deflected to the plant at 6:00 pm to supplement light for the plant. In some embodiments, a count of the light-emitting units 21 changing together may be set according to light intensity requirements of different regions, different plants or different growth stages of a same plant. For example, the stronger the light intensity required for a plant, the greater a count of the light-emitting units 21 changing together chosen. Merely by way of example, for a plant that likes light, 10 light-emitting units 21 may be set around the plant for linkage, and deflected to the plant together at 6:00 pm to supplement light for the plant. For a plant that does not like light, but still needs supplementary light, 3 light-emitting units 21 may be set around the plant for linkage, and deflected to the plant together at 6:00 μm.

Figure 16:
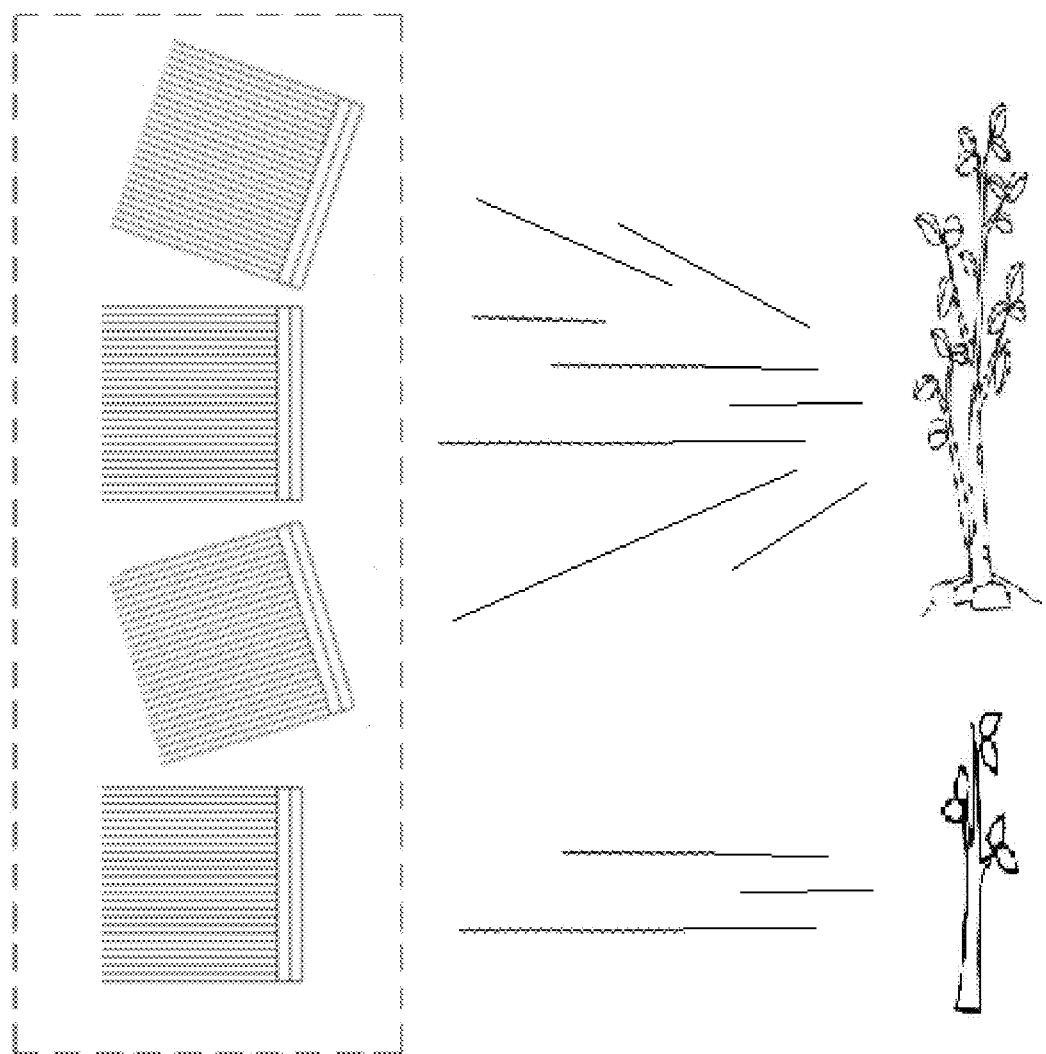
FIG. 16 is a schematic diagram illustrating linkage of a plurality of light-emitting units according to some embodiments of the present disclosure.

FIG. 16 is a schematic diagram illustrating a plurality of light-emitting units changing together according to some embodiments of the present disclosure.

In some embodiments, different light-emitting angles may be formed when the plurality of light-emitting units are linked to change together. In some embodiments, a specific count of the light-emitting units 21 is not limited herein. For example, as shown in FIG. 16, the light-emitting units 21 of the plant lamp may be set to four according to actual conditions, so as to illuminate different plants at different growth stages at the same time. At this time, three of the four light-emitting units 21 may be linked to form different angles, so as to satisfy light requirements of two plants respectively. For example, a large plant may require more light. Three light-emitting units in FIG. 16 (the top three light-emitting units in the figure) may be linked, which may be set to focus on the larger plant. The other light-emitting unit (the one at the bottom in the figure) may illuminate a smaller plant to meet light requirements of different growth stages of a same plant at the same time. In some embodiments, according to different light intensities required by different plants, different light intensities required by different parts of a same plant, or a plurality of plants needing light at the same time, a plurality of light-emitting units 21 may be set to form different light-emitting angles when they are linked together.

In some embodiments, the plant lamp may also include a control rod configured to control the light-emitting units 21 to be linked to change together. In some embodiments, the plurality of light-emitting units 21 may be connected to the control rod. The plurality of light-emitting units 21 may be controlled individually or simultaneously by controlling the control rod, so as to achieve control of the light-emitting units 21 for changing together.

Figure 17:
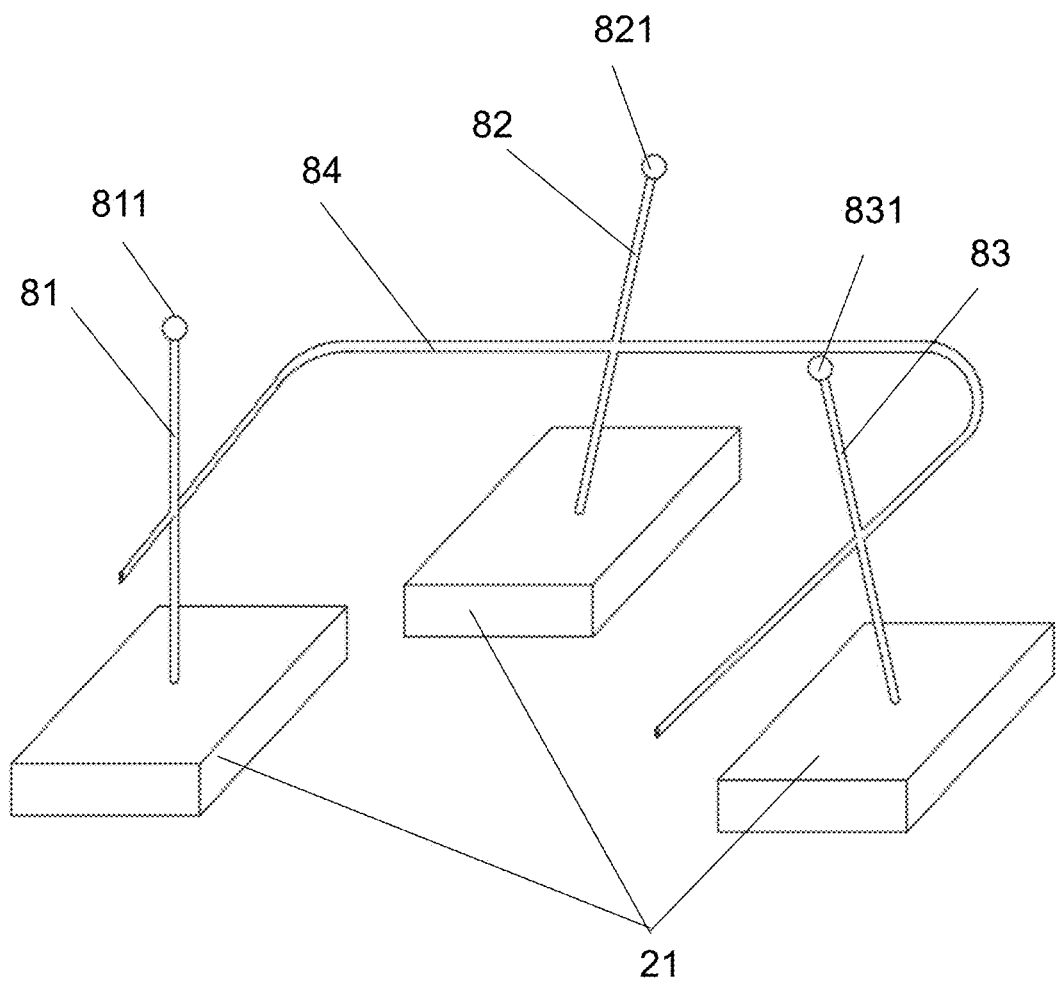
FIG. 17 is a schematic diagram illustrating a control rod controlling linkage according to some embodiments of the present disclosure.

FIG. 17 is a schematic diagram illustrating a control rod controlling linkage according to some embodiments of the present disclosure.

In some embodiments, the control rod may be connected with the light-emitting units 21, so as to perform linkage regulation on the plurality of light-emitting units 21. Merely by way of example, as shown in FIG. 17, three light-emitting units 21 may be respectively connected to three rods, namely a first rod 81, a second rod 82 and a third rod 83. Other ends of the first rod 81, the second rod 82 and the third rod 83 may be rotatably mounted. For example, the other end of the first rod 81 may be mounted on the lamp holder 1 through a first universal ball joint 811. The other end of the second rod 82 may be mounted on the lamp holder 1 through a second universal ball joint 821. The other end of the third rod 83 may be mounted on the lamp holder 1 through a third universal ball joint 831. The first rod 81, the second rod 82 and the third rod 83 may be all connected to the connection rod 84. The connection rod 84 may be connected to the control rods. The connection rod 84 may be controlled to perform circular or elliptical circular motion on a horizontal plane by controlling the control rods manually or mechanically, so that the three light-emitting units 21 may perform gyroscopic motion with the first universal ball joint 811, the second universal ball joint 821 and the third universal ball joint 831 as fulcrums respectively, and light-emitting directions, positions, etc. of the three light-emitting units 21 may be changed together, and linkage adjustment may be realized. In some embodiments, the connection rod 84 may be a straight rod, so as to connect a plurality of light-emitting units 21 on a same straight line. The connection rod 84 may also be a curved rod as shown in FIG. 17, so as to connect a plurality of light-emitting units 21 not on the same straight line.

In some embodiments, the first rod 81, the second rod 82 and the third rod 83 may be set with different lengths and different initial angles relative to the horizontal plane as required, so that the plurality of light-emitting units 21 may be rotated at different angles during the linkage adjustment and finally form different light-emitting angles. In some embodiments, the light-emitting units 21 and the rods may be set to be movably connected as required, so that the light-emitting units 21 can further change the light-emitting direction when performing linkage adjustment. For example, since the light-emitting units 21 may be movably connected to the rods, under an action of gravity, after positions of the light-emitting units 21 are changed, the light-emitting units 21 may still maintain a horizontal state.

In some embodiments, the lamp holder 1 of the plant lamp may be rotated in the horizontal plane. The light-emitting direction of the light-emitting unit 21 may be further adjusted based on rotation of the lamp holder 1 itself. For example, in some cases, a light angle formed by the light-emitting unit 21 still may not meet a light requirement of a plant well. At this time, an entire plant lamp device may be further adjusted by rotating the lamp holder 1, so that the light-emitting direction of the light-emitting unit 21 may better meet the requirement.

In some embodiments, a first space may exist between the at least one heat dissipation unit 22 and the lamp holder 1. The first space may be configured to form a first heat dissipation channel 31.

The first space may refer to a gap between the heat dissipation unit 22 and the lamp holder 1.

The first heat dissipation channel may be a channel configured to discharge hot gas and including the first space. According to a structure and arrangement of the heat dissipation unit 22 and the lamp holder 1, the first heat dissipation channel 31 may have a plurality of forms, for example, may be straight or curved, regular or irregular, and the form is not limited.

In some embodiments, the first heat dissipation channel 31 may include the first space, or may also include the first space and other spaces. For example, the first heat dissipation channel may be composed of the first space and a space between the heat dissipation unit and other components such as the light-emitting unit, etc.

Figure 18:
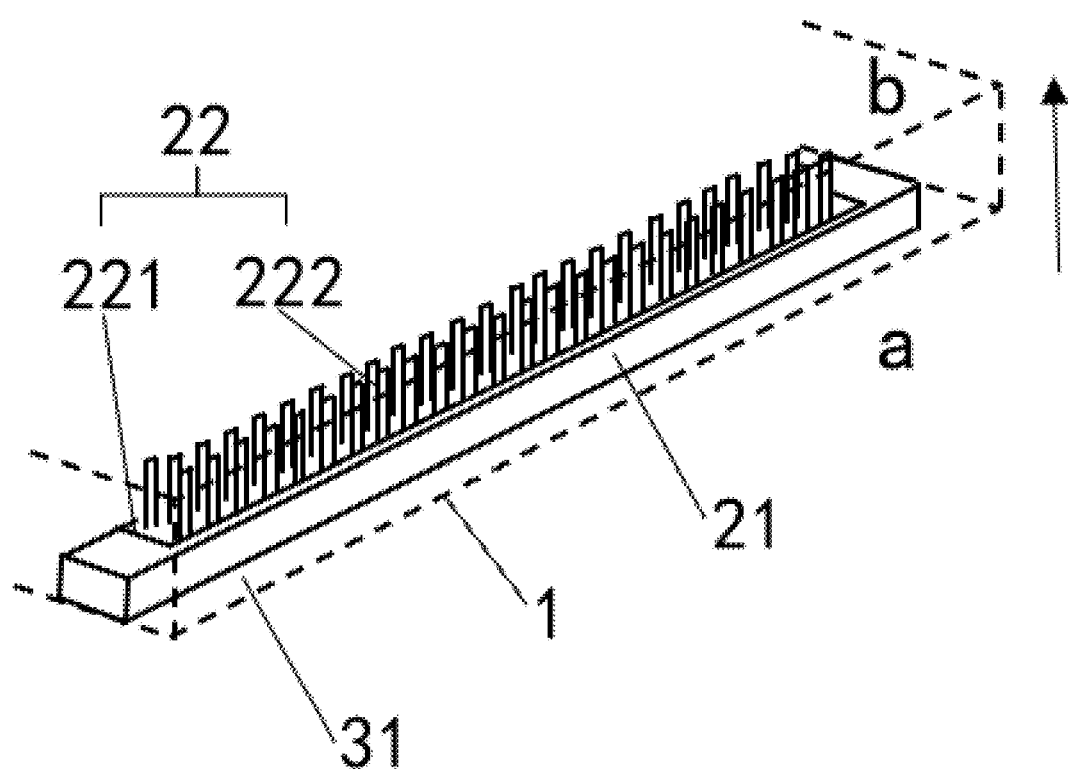
FIG. 18 is a schematic diagram illustrating a structure of a first heat dissipation channel according to some embodiments of the present disclosure.

FIG. 18 is a schematic diagram illustrating a structure of a first heat dissipation channel according to some embodiments of the present disclosure.

In some embodiments, the first heat dissipation channel 31 may be disposed between the light-emitting unit 21 and the lamp holder 1. The light-emitting unit 21 may be disposed corresponding to the heat dissipation unit 22. In some embodiments, the first heat dissipation channel 31 may penetrate from a light-emitting side to a non-light-emitting side of the light-emitting unit 21 to enhance heat dissipation intensities of the first heat dissipation channel 31 to the light-emitting side and the non-light-emitting side of the light-emitting unit 21. As shown in FIG. 18, space between the light-emitting unit 21 and the lamp holder may be considered as the first heat dissipation channel 31. The space may be not limited to the non-light-emitting side of the light-emitting unit 21 (side b in FIG. 18), but may penetrate from the light-emitting side (side a in FIG. 18) to the non-light-emitting side (side b in FIG. 17). The entire penetrating space can effectively enhance heat dissipation as the first heat dissipation channel 31.

As shown in FIG. 11 and FIG. 12, in some embodiments, the lamp holder 1 of the plant lamp may include two first frames 11 spaced apart in a first direction L1 and disposed opposite to each other and two second frames 12 spaced apart in a second direction L2 and disposed opposite to each other. Two ends of each first frame 11 in the second direction L2 may be respectively connected to the two second frames 12. The first direction L1 and the second direction L2 may be disposed to cross each other. Two ends of each light-emitting unit 21 in the second direction L2 may be respectively connected to the two second frames 12. Each light-emitting unit 21 may be located between the two first frames 11. Each first heat dissipation channel 31 may be formed between each of the first frames 11 and the corresponding light-emitting unit 21.

In some embodiments, a second space may exist between at least two heat dissipation units 22 of a plurality of heat dissipation units 22. The second space may be configured to form a second heat dissipation channel 32.

The second space may refer to a gap between the two heat dissipation units.

The second heat dissipation channel 32 may be a channel different from the first heat dissipation channel 31 and also configured to discharge hot gas. Same as the first heat dissipation channel 31, a form of the second heat dissipation channel 32 may be determined according to a structure and arrangement of the heat dissipation unit 22 and the light-emitting unit 21.

In some embodiments, the second heat dissipation channel 32 may include a second space, or may also include the second space and other spaces. The other space may be a space between two light-emitting units 21, etc.

As shown in FIG. 11 and FIG. 12, a plurality of the light-emitting units 21 may be provided. The plurality of light-emitting units 21 may be disposed in a one-to-one correspondence with the heat dissipation units 22. The heat dissipation units 22 may be connected with the corresponding light-emitting units 21 to form a plurality of integrated structures. The plurality of integrated structures 20 may be disposed in sequence at an interval, so that the second heat dissipation channel 32 may be formed between two adjacent integrated structures 20, which may penetrate vertically from the light-emitting side to the non-light-emitting side.

When the light-emitting unit 21 is working, airflow below may flow through the second heat dissipation channel 32 to a top of the second heat dissipation channel 32, flow into a central area of the heat dissipation unit 22 from a side of the heat dissipation unit 22, and continue to flow upward, which is beneficial to take away heat in the central area of the heat dissipation unit 22 and can improve the heat dissipation effect. The integrated structure 20 may be found in FIG. 2.

In some embodiments, an independent heat dissipation unit 22 may be formed by extrusion processing. Different heat dissipation units 22 may be respectively mounted on corresponding light-emitting units 21 to form a plurality of independent integrated structures 20, which is not only beneficial to heat dissipation, but also can prevent other light-emitting units 21 from interfering with adjustment of the light-emitting units 21 of which light-emitting directions need to be adjusted.

In some embodiments, the plurality of integrated structures 20 may be independently disposed, so that a second heat dissipation channel 32 may be formed between two adjacent integrated structures 20. It should be noted that for a plant lamp that does not need to consider adjusting the light-emitting direction of the light-emitting unit 21 by turning, a plurality of light-emitting units 21 may be space apart in the first direction L1, and a heat dissipation unit 22 may be provided with a plurality of light-emitting units 21. A penetrating hole may be then disposed on the heat dissipation unit 22, and a second heat dissipation channel 32 penetrating from the light-emitting side to the non-light-emitting side may be formed by the penetrating hole and a space between the two adjacent light-emitting units 21.

Figure 19:
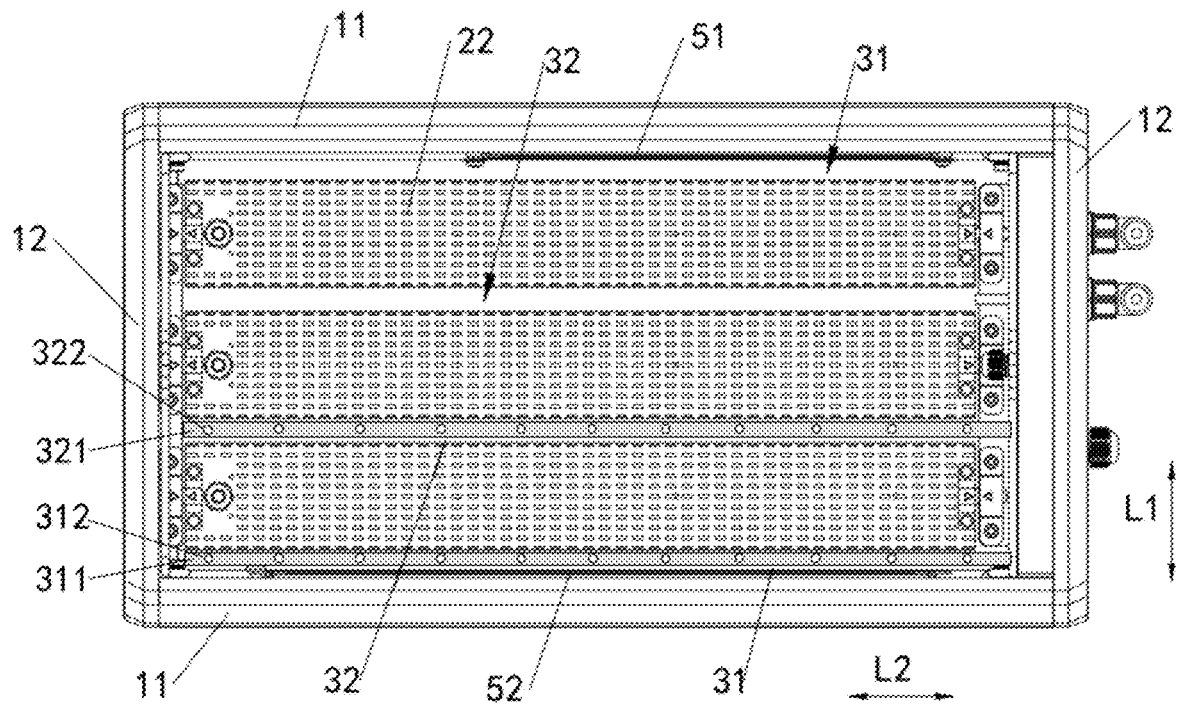
FIG. 19 is a schematic diagram illustrating a structure of a first air channel and a second air channel according to some embodiments of the present disclosure.

FIG. 19 is a schematic diagram illustrating a structure of a first air channel and a second air channel according to some embodiments of the present disclosure.

In some embodiments, as shown in FIG. 19, the first heat dissipation channel 31 may include a first air channel 311 and a first air outlet 312. The second heat dissipation channel 32 may include a second air channel 321 and a second air outlet 322. The first air channel 311 and the second air channel 321 may be channels for air flow. The first air outlet 312 and the second air outlet 322 may be through holes for air discharge. In some embodiments, the first air channel 311 may be disposed through the first heat dissipation channel 31. The first air outlet 312 may be disposed on the non-light-emitting side (a side facing the inside of the paper in FIG. 19). An end of the first air channel 311 may be provided with a ventilation device (not shown in the figure), such as a fan, etc., configured to blow air to the first air outlet 312. The second air channel 321 may be disposed through the second heat dissipation channel 32. The second air outlet 322 may be disposed on the non-light-emitting side (the side facing the inside of the paper in the figure). An end of the second air channel 321 may be provided with a ventilation device (not shown in the figure) configured to blow air to the second air outlet 322. In a specific embodiment, the ventilation devices may be disposed on the ends of the first air channel 311 and the second air channel 321. Sides of the first air channel 311 and the second air channel 321 toward the light-emitting sides (the side facing the outside of the paper in FIG. 19) may be closed. The ventilation devices may supply air into the air channel. The air may be blown out from the air outlet, and at the same time take away heat generated during a working process of a plant lamp. In another specific embodiment, the ventilation devices may be disposed on the sides of the first air channel 311 and the second air channel 321 toward the light-emitting sides (the side facing the outside of the paper in FIG. 19). The ventilation devices may be disposed opposite to the air outlets. The ventilation devices may supply air into the air outlets, and at the same time take away heat generated during a working process of a plant lamp. By disposing the ventilation devices and the air outlets, the air flow from the light-emitting side to the non-light-emitting side may be further strengthened, the heat may be taken away, which can enhance the heat dissipation effect.

In some embodiments, by disposing the first heat dissipation channel 31 and the second heat dissipation channel 32, the heat generated during the working process of the light-emitting unit 21 may be simultaneously extracted from the first heat dissipation channel 31 and the second heat dissipation channel 32 in a downward direction to form an upward airflow, which is beneficial to dissipate heat to the light emitting unit 21.

In some embodiments, at least one heat dissipation unit and the light-emitting unit connected thereto may form a non-rigid structure so that space of the second heat dissipation channel may satisfy a preset condition when a position of the light-emitting unit changes.

The non-rigid structure may refer to a structure that can be deformed under an action of external force. The non-rigid structure may be a hinge, a truss, a rotation axis, or the like, or any combination thereof.

The position change of the light-emitting unit 21 may be understood as a change of the position of the light-emitting unit 21 relative to the lamp holder 1, such as deflection and movement of the light-emitting unit 21 and. In some embodiments, when a light-emitting position of the light-emitting unit 21 is adjusted, at least one light-emitting unit 21 may move a certain distance in a certain direction. In some embodiments, when a light-emitting direction of the light-emitting unit 21 is adjusted, at least one light-emitting unit 21 may be deflected by a certain angle in a certain direction.

In some embodiments, when the light-emitting direction of the light-emitting unit 21 is adjusted and at least one light-emitting unit 21 is deflected in the first direction L1, since the light-emitting unit 21 and the at least one heat dissipation unit 22 connected thereto are not rigidly connected, the at least one heat dissipation unit 22 may keep the position unchanged or may only be deflected by a relative small angle in a same direction, so as to ensure that the space of the second heat dissipation channel 32 cannot be affected or basically not affected, so that the space of the second heat dissipation channel 32 may satisfy the preset condition. The space of the second heat dissipation channel 32 may be represented by a width, a volume, etc. of the second heat dissipation channel 32.

The preset condition may refer to a minimum threshold of the space of the second heat dissipation channel that can theoretically achieve a target heat dissipation effect. The minimum threshold may be set by a plurality of manners. For example, the minimum threshold may be manually set, determined by simulation, experiment, etc.

Figure 20:
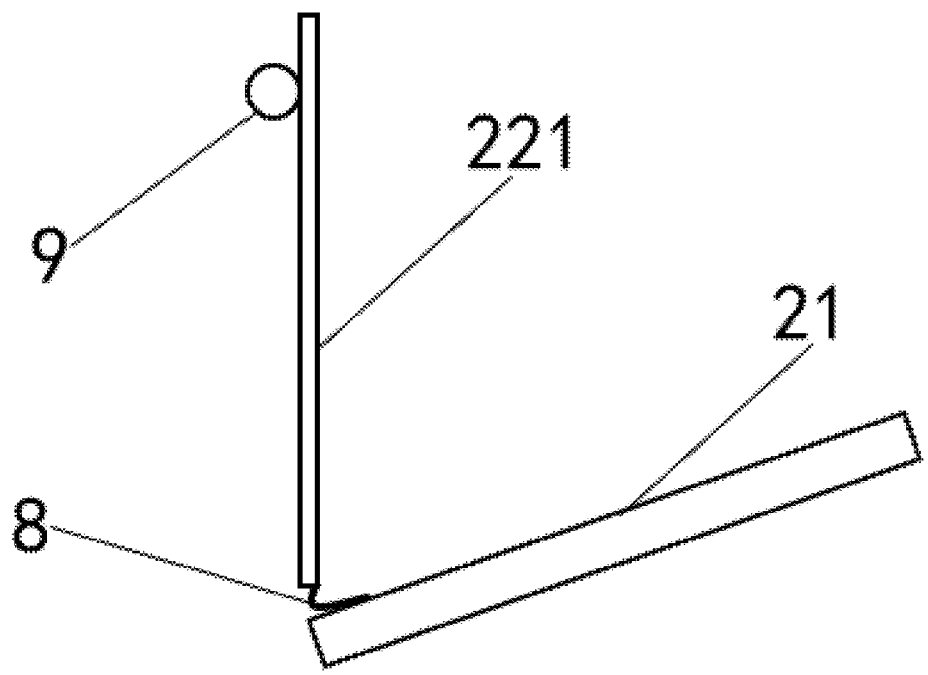
FIG. 20 is a schematic diagram illustrating a non-rigid structure according to some embodiments of the present disclosure.

FIG. 20 is a schematic diagram illustrating a non-rigid structure according to some embodiments of the present disclosure.

As shown in FIG. 20, the non-rigid structure may include a reed 8 and a blocking rod 9. One end of the reed 8 may be connected to the heat dissipation plate 221 of the heat dissipation unit 22. The other end of the reed 8 may be connected to the non-light-emitting side of the light-emitting unit 21. The blocking rod 9 may be fixedly connected to the lamp holder 1 and abut with one side or both sides of the heat dissipation plate 221 (abut with one side shown in FIG. 19). A count of reeds 8 and blocking rods 9 may be determined according to a structure and a count of the heat dissipation units 22, which is not limited herein.

Merely by way of example, as shown in FIG. 20, when the light-emitting unit 21 is deflected from a horizontal counterclockwise to a state shown in the figure, the heat dissipation plate 221 connected to the light-emitting unit 21 should be deflected counterclockwise along with the light-emitting unit 21. But, due to restraint of the blocking rod 9, the heat dissipation plate 221 cannot follow the deflection, and since the reed 8 has a certain elasticity, the restraining effect of the blocking rod 9 only exerts on the heat dissipation plate 221. Therefore, when the light-emitting unit 21 is deflected, the heat dissipation unit connected thereto cannot be deflected, thereby achieving the purpose of ensuring the space of the second heat dissipation channel 32.

In some embodiments, at least one heat dissipation unit 22 may be detachably connected to the corresponding light-emitting unit 21. For example, in an actual application process, a count of working light-emitting units 21 may be chosen according to the light intensity requirements of different regions, different plants or different growth stages of a same plant. When the count of working light-emitting units 21 is reduced, the heat dissipation requirement of the plant lamp may decrease. In this case, a count of working heat dissipation units 22 may be reduced accordingly, that is, part of the heat dissipation units 22 may be selectively detached.

In some embodiments, a whole formed by the plurality of heat dissipation units 22 may be detachably connected to the light-emitting unit 21. For example, due to long-term use of the plant lamp, when the device is covered with dust, and the heat dissipation effect of the heat dissipation unit 22 is poor, the heat dissipation unit 22 may be easily removed and cleaned as a whole to achieve better heat dissipation and prolong a service life of the plant lamp.

Figure 21:
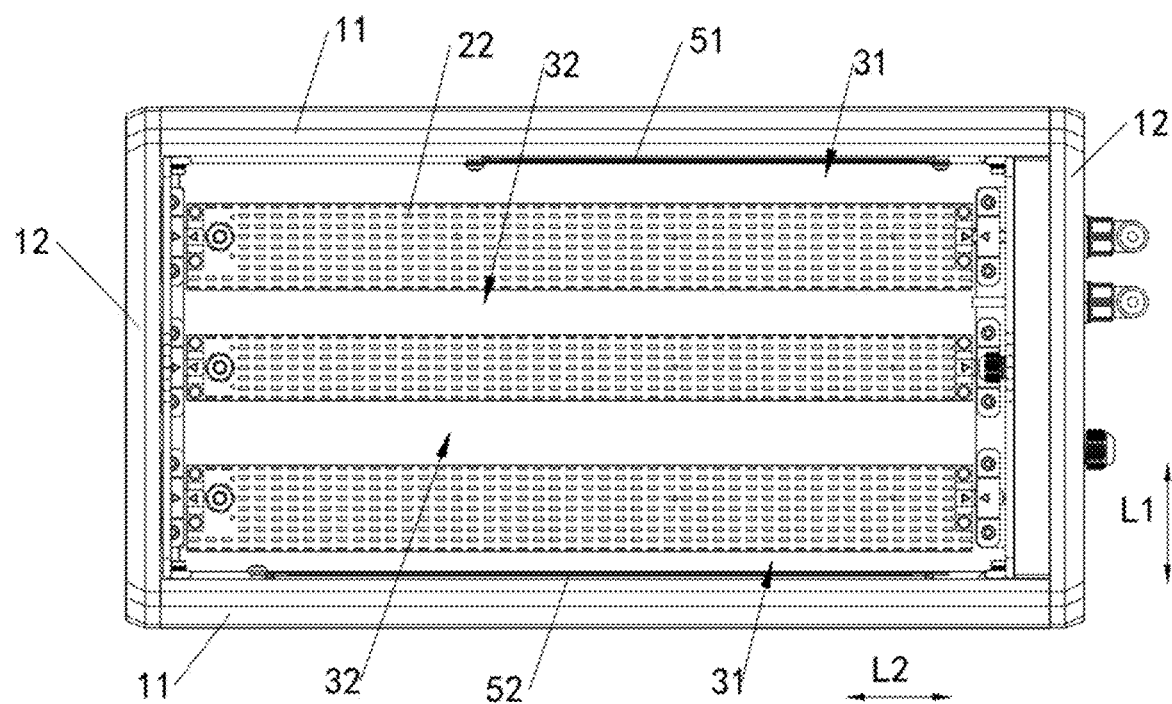
FIG. 21 is a schematic diagram illustrating a structure of a heat dissipation unit according to some embodiments of the present disclosure.

FIG. 21 is a schematic diagram illustrating a structure of a heat dissipation unit according to some embodiments of the present disclosure.

As shown in FIG. 21, in some embodiments, the heat dissipation units 22 may extend different lengths in different directions to form heat dissipation channels with different widths. In some embodiments, the heat dissipation units 22 may formed into a plurality of shapes based on different lengths extending in different directions, which may be rectangular, square or other irregular shapes. In some embodiments, the heat dissipation units 22 may include a plurality of rectangular structures of different widths. For example, when the three light-emitting units of the plant lamp are spaced apart in sequence, the rectangular heat dissipation units 22 and the light-emitting units 21 with different widths may be disposed in a one-to-one correspondence, so that the second heat dissipation channels 32 with different widths may be formed between the heat dissipation units 22 and the first heat dissipation channels 31 with different widths may be formed between the heat dissipation unit 22 and the lamp holder 1.

In some embodiments, the plant lamp may also include an electric control structure. In some embodiments, the electric control structure electrically connected to the light-emitting units 21 may be configured to supply power to the light-emitting units 21 and control the light-emitting units 21 to work. The electric control structure may be in a non-contact manner with the light-emitting units 21. The electrical connection may refer to that the electric control structure is connected with the light-emitting units through a circuit. The non-contact manner may refer to that the electric control structure and the light-emitting units 21 are not in direct contact in the space, so as to prevent a high temperature of the light-emitting units 21 from affecting normal operation of the electric control structure.

In some embodiments, because the electric control structure may also generate heat during a working process, in order to facilitate heat dissipation of the electric control structure and extend a service life of the electric control structure, the electric control structure may be mounted in the lamp holder 1 and located in the first heat dissipation channel 31, and the electric control structure and the light-emitting component 2 may be in non-contact. When the light-emitting unit 21 is working, an upward airflow in the first heat dissipation channel 31 may be used to take away heat generated by the operation of the electric control structure, so as to realize the heat dissipation of the electric control structure. Moreover, the electric control structure may be arranged in a non-contact manner with the light-emitting component 2, which can effectively avoid heating of the electric control structure and ensure heat dissipation effects of the electric control structure.

In some embodiments, the electric control structure may be mounted on an inner side wall of the lamp holder 1, and a third space may exist between the electric control structure and at least one heat dissipation unit 22.

The third space may refer to a gap between the heat dissipation unit and the electric control structure. In some embodiments, the third space may be located within the first heat dissipation channel 31.

In some embodiments, the lamp holder 1 may be provided with connection components 4 on both sides of the second direction. In order to simplify the structure of the lamp holder 1 and facilitate mounting the electric control structure, the electric control structure may be mounted on the inner side wall of the lamp holder 1 in the first direction L1. Specifically, the lamp holder 1 may include four side frames. The four side frames may be connected end to end to form a rectangular frame. The four side frames may be respectively two first frames 11 disposed opposite to each other in the first direction and two second frames 12 disposed opposite to each other in the second direction. The first frames 11 may extend in the second direction. The second frames 12 may extend in the first direction. Two ends of the each first frame 11 in the second direction may be respectively connected to the two second frames 12 to form a rectangular frame. The each second frame 12 may be provided with a mounting seat 42. The first frame 11 may be provided with a mounting groove. The electric control structure may be disposed in the mounting groove and mounted on the first frame 11 by a fastener.

In some embodiments, a count of electric control structures is not limited, which may be one or more. In some embodiments, two electric control structures may be provided, which may be a first electric control structure 51 and a second electric control structure 52. The first electric control structure 51 may be configured to supply power to one of the three light-emitting units 21 and control it to work. The second electric control structure 52 may be configured to supply power to the other two light-emitting units 21 and control them to work. The first electric control structure 51 may be located in one of the first heat dissipation channels 31 and may be mounted on the first frame 11 forming the first heat dissipation channel 31. The second electric control structure 52 may be located in the other first heat dissipation channel 31 and mounted on the first frame 11 forming the first heat dissipation channel 31. It should be noted that arrangement of the electric control structures is not limited to the above arrangement. The count of electric control structures may be determined according to a count of light-emitting units 21 and the structure of the lamp holder 1.

In some embodiments, the two electric control structures may be both elongated structures extending in the second direction. The two electric control structures may be respectively mounted in the inner side walls of the corresponding first frames 11. The first frame 11 may be made of heat dissipation material. In this way, a contact area between the electric control structure and the first frame 11 may be increased, so that part of the heat generated by the electric control structure may be directly exported through the first frame 11 when the heat dissipation of the electric control structure is realized by using the upward airflow in the first heat dissipation channel 31 and heat dissipation effects of the electric control structure can be further improved. For example, the two first frames may be aluminum frames. For example, the two electric controlled structures may be respectively mounted on the corresponding first frames 11.

Furthermore, as shown in FIG. 14, the two electric control structures may be connected with wires. In order to avoid wiring confusion, the inner side walls of the first frames 11 may be provided with wiring grooves 111 to facilitate placement of wires connecting the two electric control structures. Optionally, two wiring grooves 111 may be provided on the inner side walls of the first frames 11. The wiring grooves 111 may extend in the second direction. The two wiring grooves 111 may be spaced apart in a direction from a light-emitting side to a non-light-emitting side.

In some embodiments, the plant lamp may also include a temperature sensing switch. The electric control structure electrically connected to the temperature sensing switch may be configured to adjust the light-emitting units according to an ambient temperature.

The temperature sensing switch may be configured to detect the ambient temperature. In some embodiments, the temperature sensing switch may be mounted on an outer wall of the plant lamp holder 1 and connected to the electric control structure through a circuit.

For example, when the temperature sensing switch detects that the ambient temperature increases, which may be considered that a light intensity required by the plant is weakened. When a preset temperature threshold is reached, the temperature sensing switch may control at least one light-emitting unit 21 to stop working through the electric control structure, so as to reduce the light intensity of the plant lamp. The preset temperature threshold may be a maximum temperature suitable for plant growth and development set in advance.

In some embodiments, the electric control structure may be electrically connected to the temperature sensing switch and the light-emitting unit 21 may be adjusted according to the ambient temperature, which can not only save energy and electricity, but also ensure the light intensity required for plant growth.

Figure 22:
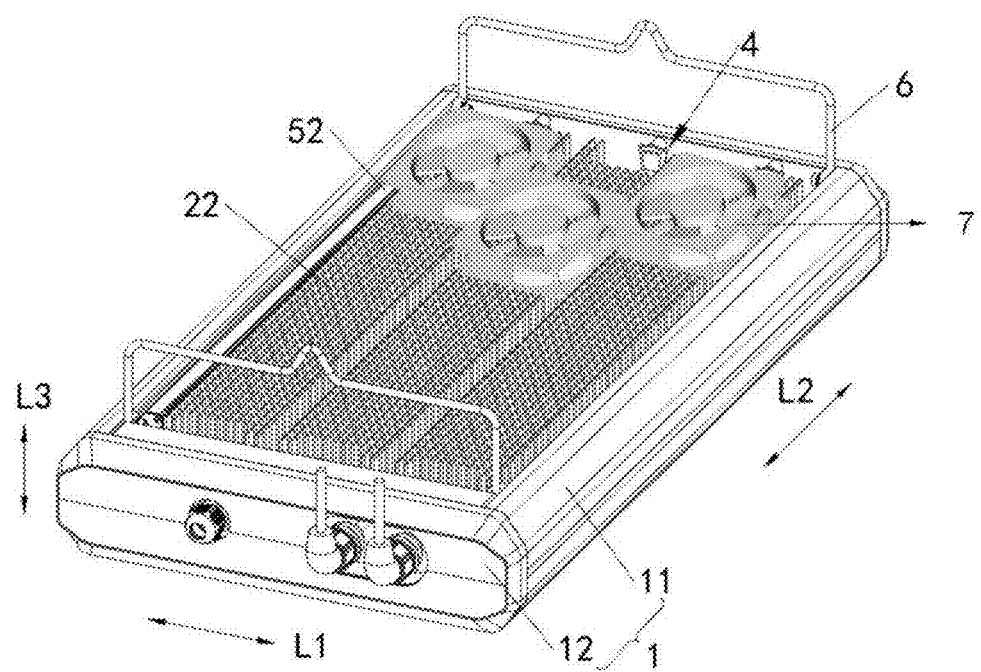
FIG. 22 is a schematic diagram illustrating a structure of a ventilation device according to some embodiments of the present disclosure.

FIG. 22 is a schematic diagram illustrating a structure of a ventilation device according to some embodiments of the present disclosure.

As shown in FIG. 22, in some embodiments, the plant lamp may also include at least one ventilation device 7. The ventilation device 7 may be a device that can be used to accelerate air flow, such as a draught fan, a fan, etc. which is not limited herein. In some embodiments, the ventilation device 7 may be configured as a fan. The ventilation device 7 may be one or more. A count of the ventilation devices 7 may be determined according to a count of light-emitting units 21. For example, three light-emitting units 21 may be provided. For better heat dissipation, three ventilation devices 7 may also be provided.

In some embodiments, the ventilation device 7 may be mounted in at least one of the heat dissipation unit 22, the first heat dissipation channel 31, the second heat dissipation channel 32, etc. to accelerate heat dissipation. For example, the ventilation device 7 may be mounted on the heat dissipation fin 222 of the heat dissipation unit 22, and the fan may rotate to accelerate air flow near the heat dissipation fin 222 to dissipate heat faster. As another example, the ventilation devices 7 may be mounted on ends of the first heat dissipation channel 31 and the second heat dissipation channel 32. Rotation of fan blades of the ventilation devices 7 may cause air in the first heat dissipation channel 31 and the second heat dissipation channel 32 to flow through an air outlet at an accelerated rate to be discharged to outside, which can further enhance heat dissipation.

In some embodiments, the ventilation devices 7 may be disposed in a one-to-one correspondence with the light-emitting units 21, and may be controlled by the electric control structure. For example, in an actual application process, when a required light intensity decreases due to factors such as a plant growth stage or an ambient temperature, control of the light-emitting units 21 and the ventilation devices 7 may be realized through the electric control structure. Specifically, the plant lamp may be provided with two electric control structures, which may be the first electric control structure 51 and the second electric control structure 52. The first electric control structure 51 may be configured to control at least one of the three light-emitting units 21 and the corresponding at least one of three ventilation devices 7 to work. The second electronic control structure 52 may be configured to work for the remaining light-emitting units 21 and the corresponding remaining ventilation devices 7. When a light intensity required by a plant required decreases, the electric control structure 51 may be configured to stop one or more of the three light-emitting units 21 and the corresponding three ventilation devices 7 from working, so as to satisfy the light intensity required for plant growth and save energy.

In some embodiments, a ventilation power of the ventilation device 7 may be controlled by the electric control structure. The ventilation power may represent power consumption per unit time of the ventilation device 7. It may be understandable that the greater the power consumption per unit time, the greater a corresponding rotation speed of the ventilation device 7, the greater an air supply volume, and the greater the heat dissipation gain.

In some embodiments, the ventilation device 7 may be configured to adjust the ventilation power according to a ventilation power adjustment instruction issued by the electric control structure. In some embodiments, the ventilation power adjustment instruction may be determined based on a machine learning model.

The ventilation power adjustment instruction may refer to an instruction issued by the electric control structure and related to adjusting the power of the ventilation device 7. After receiving the ventilation power adjustment instruction, the ventilation device 7 may adjust the ventilation power to change the ventilation volume per unit time, thereby changing heat dissipation efficiency.

In some embodiments, the electric control structure may adjust at least one ventilation device 7 through different ventilation power adjustment instructions, so as to improve working efficiency of the plant lamp.

In some embodiments, when the ventilation power determined based on the ventilation power adjustment instruction reaches a maximum power value and exceeds a duration threshold, the electric control structure may issue a warning notification. The maximum power value may be a rated power of the ventilation device 7 or a maximum permissible operating power. For example, the maximum power value may be preset by a user or automatically set by the electric control structure according to information of the ventilation device 7.

In some embodiments, the warning notification may include light flashing, beeping, etc., so that the user may intuitively obtain the warning notification of the plant lamp and deal with it in time.

In some embodiments, the electric control structure may determine the ventilation power adjustment instruction based on different light-emitting intensities, different light-emitting duration, and ambient temperatures. In some embodiments, the electric control structure may determine the ventilation power adjustment instruction based on historical data/network platform data/staff experience value, etc. In some embodiments, the electric control structure may determine the ventilation power adjustment instruction based on the machine learning model.

Figure 23:
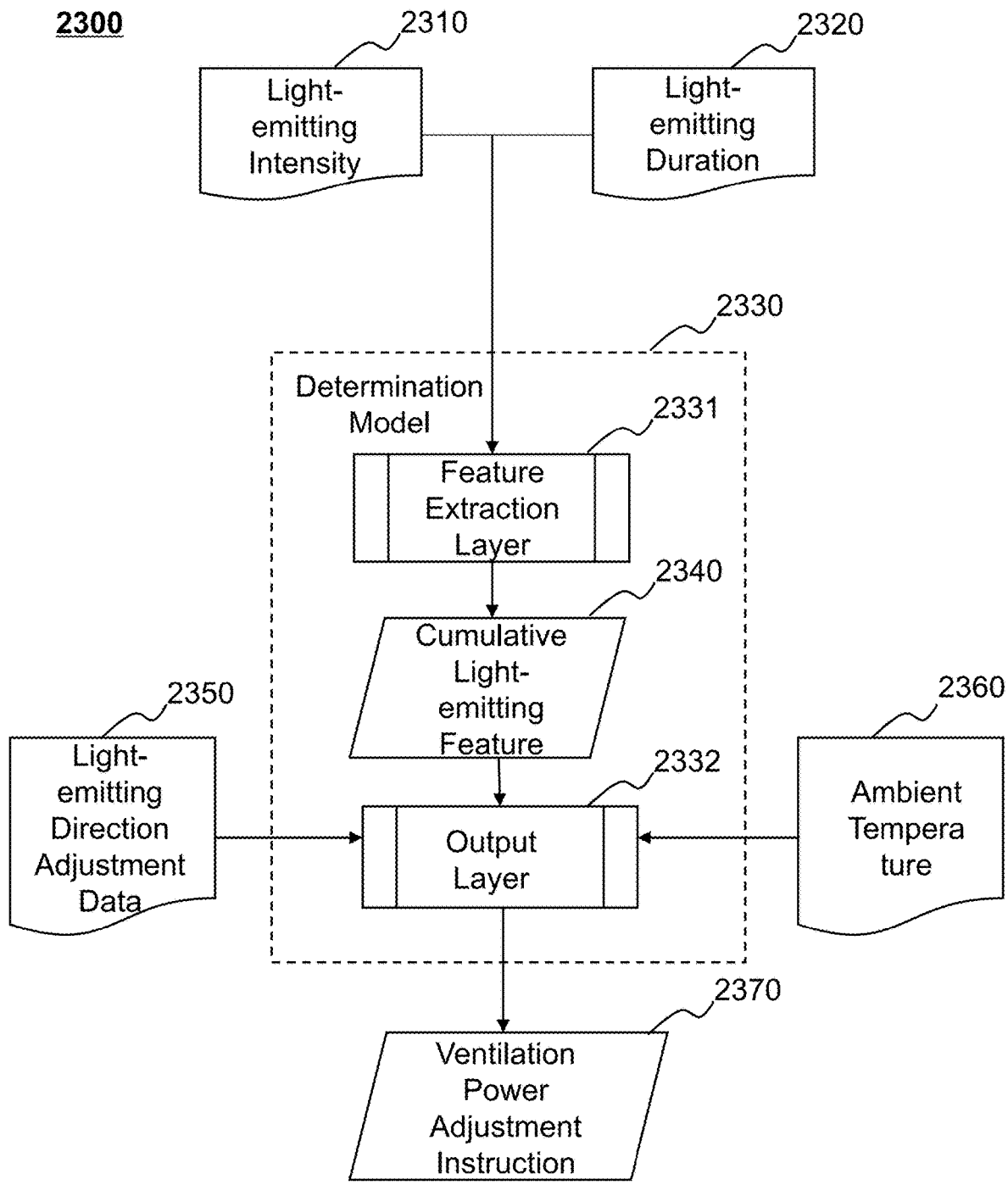
FIG. 23 is a schematic diagram illustrating a determination model according to some embodiments of the present disclosure.

FIG. 23 is a schematic diagram illustrating a determination model according to some embodiments of the present disclosure.

As shown in FIG. 23, the electric control structure may process a light-emitting intensity 2310, a light-emitting duration 2320, light-emitting direction adjustment data 2350 and an ambient temperature 2360 of the light-emitting unit 21 by using the determination model 2330 to determine a ventilation power adjustment instruction 2370. The determination model 2330 may include a feature extraction layer 2331 and an output layer 2332.

In some embodiments, an input of the feature extraction layer 2331 may include the light-emitting intensity 2310 and the light-emitting duration 2320. An output of the feature extraction layer 2331 may be a cumulative light-emitting feature 2340. An input of the output layer 2332 may include the cumulative light-emitting feature 2340, the light-emitting direction adjustment data 2350, and the ambient temperature 2360. An output of the output layer 2332 may be the ventilation power adjustment instruction 2370.

In some embodiments, the light-emitting direction adjustment data 2350 may include a light-emitting direction adjustment instruction, a frequency of light-emitting direction adjustment, etc. The frequency of light-emitting direction adjustment may refer to a count of times the light-emitting direction is adjusted within a certain time period. It may be understandable that the greater the count of light-emitting direction adjustment instructions, the greater the frequency of light-emitting direction adjustment. More descriptions regarding the light-emitting direction adjustment instruction may be found in FIG. 24 and relevant descriptions thereof.

By considering the light-emitting direction adjustment data as the input of the determination model, the user may appropriately adjust relevant data of the ventilation power adjustment instruction output by the model according to a working state of the light-emitting unit 21. For example, when the working state of the light-emitting unit 21 is a light-gathering state, the ventilation power may be appropriately increased.

In some embodiments, the user may also appropriately adjust the relevant data of the ventilation power adjustment instruction output by the model according to the frequency of the light-emitting direction adjustment. For example, when the frequency of light-emitting direction adjustment is greater than a time threshold, the ventilation power may be appropriately increased to prevent a motor from overheating due to frequent work and improve heat dissipation efficiency.

In other embodiments, the light-emitting direction adjustment data 2350 may also include whether the light-emitting direction adjustment instruction is executed in time. It may be understood that when the light-emitting direction adjustment instruction is not executed in time, the motor may be in a fault state. For example, when the light-emitting direction adjustment instruction is not executed in time, the ventilation power may be appropriately increased to prevent the motor from overheating due to failure and causing severe consequences.

In some embodiments, the feature extraction layer 2331 and the output layer 2332 may be obtained through joint training, and the determination model 2330 may be obtained. The output of the feature extraction layer 2331 may be used as part of the input of the output layer 2332.

For example, sample training data, that is, a sample light-emitting intensity and a sample light-emitting duration, may be input to an initial feature extraction layer to obtain a cumulative light-emitting feature output by the initial feature extraction layer. The cumulative light-emitting feature together with a sample ambient temperature and sample light-emitting direction adjustment data may be input into the initial output layer to obtain the ventilation power adjustment instruction output by the initial output layer. An output result of the initial output layer may be verified by using the sample ventilation power adjustment instruction, and verification data of the output result of the initial output layer may be obtained by using a back-propagation feature of a neural network model. The above training may be continued by using the verification data until a trained feature extraction layer and a trained output layer are obtained.

As another example, a sample light-emitting time and the sample light-emitting duration may also be input into the initial feature extraction layer and the output result of the initial feature extraction layer together with the sample light-emitting direction adjustment data and the sample ambient temperature may be input to the initial output layer. A loss function may be constructed based on an output result and labels of the initial output layer. At the same time, parameters of the initial feature extraction layer and the initial output layer may be updated until the initial feature extraction layer and the initial output layer satisfy a preset condition, and the trained feature extraction layer and the trained output layer are obtained. The preset condition may be that the loss function is smaller than a threshold, converges, or a training period reaches a threshold. In some embodiments, a manner for iteratively updating model parameters may include a conventional model training manner such as stochastic gradient descent, etc.

In some embodiments of the present disclosure, the electric control structure may determine the ventilation power adjustment instruction through the determination model, so that real-time adjustment of the ventilation device power may be realized according to an actual situation, which can effectively satisfy requirements of the user, reduce probability of failure of the plant lamp due to poor heat dissipation, and reduce maintenance costs.

In some embodiments, the plant lamp may also include an electric device, and the electric device may be configured to receive the light-emitting direction adjustment instruction, and adjust the light-emitting direction of at least one light-emitting unit 21 based on the light-emitting direction adjustment instruction. In some embodiments, the light-emitting direction adjustment instruction may be issued by the electric control structure.

In some embodiments, the electric control structure may determine the light-emitting direction adjustment instruction based on historical data/network platform data/staff experience value, etc.

In some embodiments, the light-emitting direction adjustment instruction may be determined based on a machine learning model.

In some embodiments, the light-emitting direction adjustment instruction may be determined based on parameters related to the light-emitting unit 21 and/or plant growth, etc. In a specific embodiment, the light-emitting direction adjustment instruction may be determined based on the light-emitting intensity and the light-emitting duration of the light-emitting unit.

Figure 24:
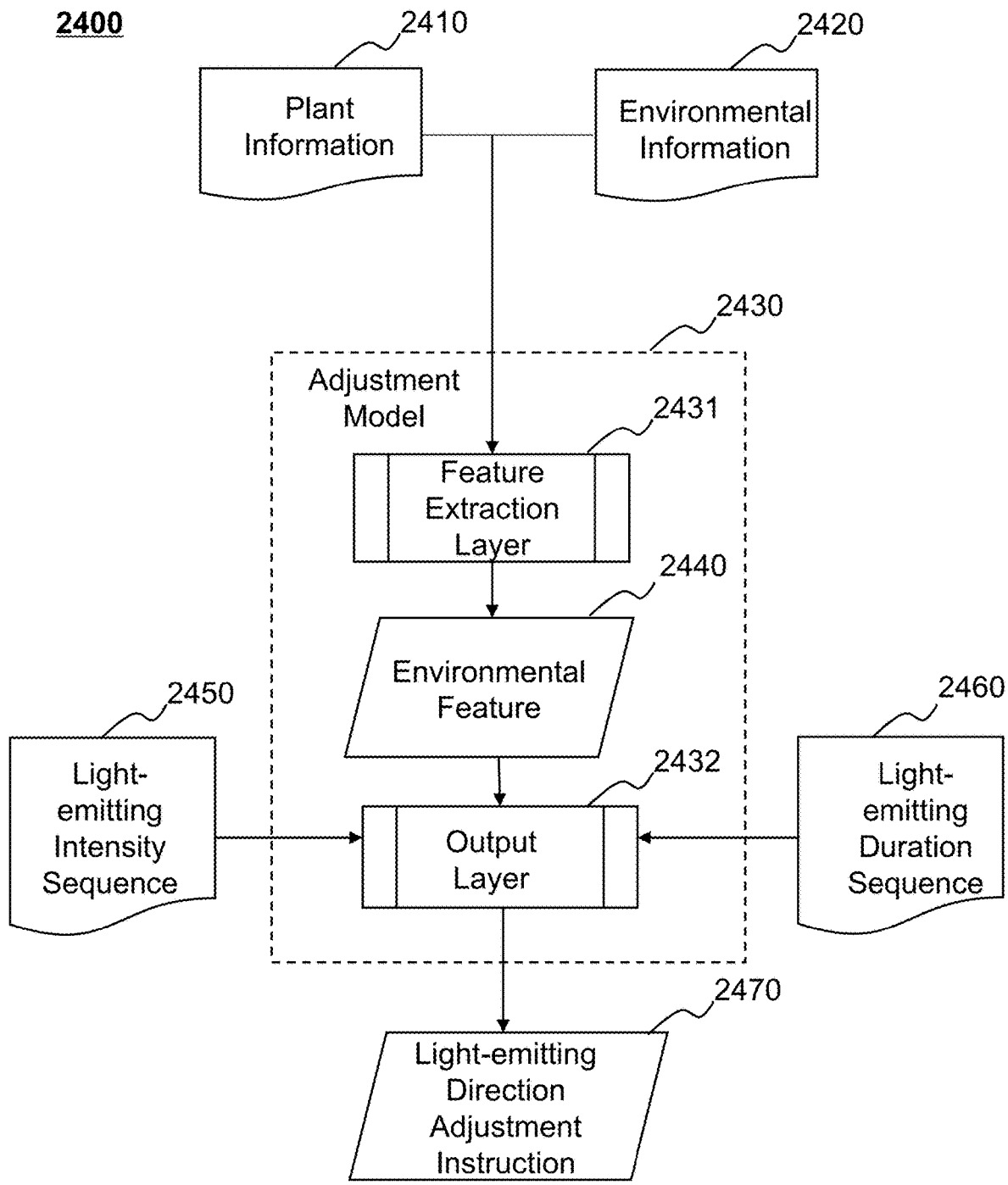
FIG. 24 is a schematic diagram illustrating an adjustment model according to some embodiments of the present disclosure.

FIG. 24 is a schematic diagram illustrating an adjustment model according to some embodiments of the present disclosure.

As shown in FIG. 24, plant information 2410, environmental information 2420, a light-emitting intensity sequence 2450, and a light-emitting duration sequence 2460 may be processed by using the adjustment model 2430 to determine a light-emitting direction adjustment instruction 2470. The light-emitting intensity sequence 2450 and the light-emitting duration sequence 2460 may include light-emitting intensities and light-emitting durations of a plurality of light-emitting units, and the light-emitting direction adjustment instruction 2470 may include instructions for adjusting the light-emitting directions of the plurality of light-emitting units. The adjustment model 2430 may include a feature extraction layer 2431 and an output layer 2432.

In some embodiments, an input of the feature extraction layer 2431 may include the plant information 2410 and the environmental information 2420. An output of the feature extraction layer 2431 may be an environmental feature 2440.

The plant information 2410 may refer to information related to a plant illuminated by the plant lamp. For example, the plant information 2410 may include, but is not limited to, a type, a quantity, a plant density, etc. of plants. For example, the plant information 2410 may be determined based on data input to an electric control structure in advance by a user.

The environmental information 2420 may refer to information related to an environment where a plant lamp is located. For example, the environmental information may include but is not limited to, a distance between a plant lamp and a plant, a natural light intensity, a mounting position of a plant lamp. For example, the natural light intensity or the distance between a plant lamp and a plant may be obtained based on a light sensor, an infrared sensor, etc. As another example, the environmental information 2420 may also be determined based on the data input to the electric control structure in advance by the user.

In some embodiments, an input of the output layer 2432 may include the environmental feature 2440, the light-emitting intensity sequence 2450, and the light-emitting duration sequence 2460. An output of the output layer 2432 may be the light-emitting direction adjustment instruction 2470.

In some embodiments, the adjustment model and the determination model may be obtained through joint training. More descriptions regarding joint training may be found in FIG. 23 and relevant descriptions thereof.

In some embodiments, the feature extraction layer 2431 and the output layer 2432 may be also obtained through joint training. and then the adjustment model 2430 may be obtained. The output of the feature extraction layer 2431 may be used as part of the input of the output layer 2432. More descriptions regarding joint training may be found in FIG. 23 and relevant descriptions thereof.

In some embodiments, the electric device may also be configured to form a light-emitting adjustment scheme based on light-emitting direction adjustment instruction. In some embodiments, the light-emitting adjustment scheme may include direction adjustment of light-emitting units at a plurality of consecutive time points. Historical vectors may be constructed respectively based on historical data. A database may be established based on the historical vectors and the corresponding labels. Elements in the historical vectors may include the plant information, the environmental information, the light-emitting intensity and the light-emitting duration of the light-emitting unit, etc. The labels corresponding to the historical vector may include a most suitable light-emitting direction of each light-emitting unit at the plurality of consecutive time points. The most suitable light-emitting direction may be determined based on the adjustment model. The current vectors may be constructed based on current plant information and environmental information, and the current vectors may be matched with the historical vectors in the database. A label corresponding to the historical vector whose distance from the current vectors is less than a threshold may be used as the most suitable light-emitting direction for matching, and the light-emitting direction adjustment scheme may be determined based on the most suitable light-emitting direction.

In some embodiments, the electric device may adjust the light-emitting direction of the at least one light-emitting unit based on the light-emitting adjustment scheme.

In some embodiments of the present disclosure, based on a large amount of extensive data, the adjustment model may be trained. By using the trained adjustment model, different adjustment of the light-emitting directions of different light-emitting units of the plant lamp can be determined relatively quickly and accurately, so as to satisfy light intensity requirements of different plants or different growth stages of the same plant, and improve user satisfaction. In addition, based on a large amount of historical data to establish the database, the user can reasonably determine the most reasonable light-emitting adjustment data of the plant lamp by matching the historical data that is same as or similar to the current information, which can effectively improve use efficiency of the plant lamp.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A plant lamp, comprising
one or more light-emitting units, each of which includes a light-emitting side and a non-light-emitting side oppositely disposed;
a lamp holder, wherein the one or more light-emitting units are mounted on the lamp holder; and
one or more dynamic connection components, each of which is configured to connect at least one of the one or more light-emitting units to the lamp holder, and enables the at least one light-emitting unit to rotate relative to the lamp holder to adjust a light-emitting direction of the at least one light-emitting unit, wherein each of the one or more dynamic connection components has a plurality of preset positions so that the at least one light-emitting unit can be rotated to a plurality of preset angles corresponding to the plurality of preset positions and locked.

2. The plant lamp of claim 1, wherein at least two of the one or more dynamic connection components have different preset positions.

3. The plant lamp of claim 1, wherein opposite ends of each of the one or more light-emitting units are respectively mounted on the lamp holder through one of the dynamic connection components.

4. The plant lamp of claim 1, wherein each of the one or more dynamic connection components includes a connection unit including:
a first connection part disposed on one of the at least one light-emitting unit and the lamp holder; and
a second connection part disposed on the other of the at least one light-emitting unit and the lamp holder, and can be inserted into or separated from the first connection part.

5. The plant lamp of claim 4, wherein the first connection part includes a connection plate provided with a plurality of locking holes, and the plurality of locking holes are disposed at an interval along a circumferential direction of a rotation axis of the at least one light-emitting unit relative to the lamp holder;

the second connection part is a protruding structure, and the protruding structure can be inserted into any one of the locking holes; and the connection plate can be elastically deformed so that the first connection part can be separated from the second connection part.

6. The plant lamp of claim 5, wherein the first connection part is disposed on the at least one light-emitting unit, and the dynamic connection component further includes:

a mounting seat connected to the lamp holder, wherein one end of the rotation axis is connected to the at least one light-emitting unit, the other end is connected to one end of the connection plate after passing through the mounting seat, the rotation axis is rotatably connected to the mounting seat, and the locking holes are disposed on the other end of the connection plate.

7. The plant lamp of claim 5, wherein the second connection part further includes a limit part, and the limit part abuts against the connection plate when the protruding structure is inserted into any one of the locking holes.

8. The plant lamp of claim 7, wherein the protruding structure is a step structure including a small diameter section that can be inserted into any one of the locking holes and a large diameter section that connects the small diameter section to the lamp holder, and a step surface formed by the small diameter section and the large diameter section is the limit part.

9. The plant lamp of claim 1, wherein each of the one or more dynamic connection component includes a connection unit including:

a first connection hole disposed on one of the at least one light-emitting unit and the lamp holder;

a second connection hole disposed on the other of the at least one light-emitting unit and the lamp holder, wherein the second connection hole is an arc-shaped hole, and is coaxial with a rotation axis of the at least one light-emitting unit relative to the lamp holder; and a locking member penetrated through the first connection hole and the second connection hole, wherein the locking member can move in the second connection hole along a circumferential direction of the rotation axis, and can lock the at least one light-emitting unit and the lamp holder.

10. The plant lamp of claim 1, further comprising a plurality of suspension parts, wherein each of two opposite ends of the lamp holder are respectively provided with one of the plurality of suspension parts which is configured to hook and connects with a hook for the plant lamp.

11. The plant lamp of claim 10, wherein two ends of each of the plurality of suspension part are respectively connected with mounting rings, an upper side of the lamp holder is folded inward to form a flange, and the mounting rings and the flange are connected by fasteners.

12. The plant lamp of claim 1, wherein at least two of the one or more light-emitting units are linked.

13. The plant lamp of claim 12, wherein different light-emitting angles are formed when the at least two light-emitting units are linked.

14. The plant lamp of claim 12, further comprising a control rod configured to control the at least two light-emitting units to be linked.

15. The plant lamp of claim 1, wherein the lamp holder is rotatable in a horizontal plane.

16. The plant lamp of claim 1, further comprising an electric device configured to receive a light-emitting direction adjustment instruction, and adjust the light-emitting direction of the at least one light-emitting unit based on the light-emitting direction adjustment instruction.

17. The plant lamp of claim 16, wherein the light-emitting direction adjustment instruction is determined based on a machine learning model.

18. The plant lamp of claim 16, wherein the light-emitting direction adjustment instruction is determined based on a light-emitting intensity and a light-emitting duration of each of the one or more light-emitting units.

19. The plant lamp of claim 16, wherein the electric device is further configured to:

form, based on the light-emitting direction adjustment instruction, a light-emitting adjustment scheme;

adjust, based on the light-emitting adjustment scheme, the light-emitting direction of the at least one light-emitting unit, wherein the light-emitting adjustment scheme includes direction adjustment of the one or more light-emitting units at a plurality of consecutive time points.

* * * * *